(12) United States Patent
Tsuruta

(10) Patent No.: US 6,729,108 B2
(45) Date of Patent: May 4, 2004

(54) METHOD FOR MANUFACTURING FLEXIBLE BAGS AND VERTICAL TYPE FORMING, FILLING AND SEALING MACHINE

(75) Inventor: Orihiro Tsuruta, Gunma (JP)

(73) Assignee: Orihiro Engineering Co., Ltd., Takasaki (JP)

(*) Notice: Subject to any disclaimer, the term of this patent is extended or adjusted under 35 U.S.C. 154(b) by 0 days.

(21) Appl. No.: 09/799,564

(22) Filed: Mar. 7, 2001

(65) Prior Publication Data

US 2002/0104292 A1 Aug. 8, 2002

(30) Foreign Application Priority Data

Feb. 6, 2001 (JP) .......................... 2001-029589

(51) Int. Cl.[7] ................................. B65B 9/00
(52) U.S. Cl. ..................... 53/451; 53/550; 53/552
(58) Field of Search .................. 53/451, 450, 550, 53/551, 552

(56) References Cited

U.S. PATENT DOCUMENTS

| | | | | |
|---|---|---|---|---|
| 4,077,186 A | * | 3/1978 | Voegele | 53/451 |
| 4,534,159 A | | 8/1985 | Kelly | |
| 5,463,851 A | * | 11/1995 | Nagai | 53/374.8 |
| 6,041,579 A | * | 3/2000 | Savoury et al. | 53/236 |
| 6,308,498 B1 | * | 10/2001 | Malin et al. | 53/133.4 |
| 6,314,706 B1 | * | 11/2001 | Araki et al. | 53/451 |

FOREIGN PATENT DOCUMENTS

| | | |
|---|---|---|
| EP | 0 518 237 | 12/1992 |
| EP | 0 917 946 | 5/1999 |
| EP | 0 965 525 | 12/1999 |
| EP | 0965525 | * 12/1999 |
| JP | 11-152104 | 6/1999 |

* cited by examiner

Primary Examiner—Rinaldi I. Rada
Assistant Examiner—Hemant M Desai
(74) Attorney, Agent, or Firm—Oblon, Spivak, McClelland, Maier & Neustadt, P.C.

(57) ABSTRACT

A vertical type forming, filling and sealing machine according to the present invention includes a film shaping mechanism for forming long lengths of film into tubular shapes, a vertical sealing mechanism for heat sealing the edges of the film formed by the film shaping mechanism in the longitudinal direction of the film to form tubular film, a supply nozzle for supplying contents into the tubular film, and two horizontal sealing mechanisms for heat sealing the tubular film in its width direction. A first horizontal sealing mechanism heat seals opposing inner surfaces of the tubular film except for a portion in the width direction. A second horizontal sealing mechanism is placed below the first horizontal sealing mechanism and heat seals the area which is not heat sealed by the first horizontal sealing mechanism.

24 Claims, 23 Drawing Sheets

METHOD FOR MANUFACTURING FLEXIBLE BAGS AND VERTICAL TYPE FORMING, FILLING AND SEALING MACHINE

BACKGROUND OF THE INVENTION

1. Field of the Invention

The present invention relates to a method for manufacturing flexible bags and to a vertical type forming, filling and sealing machine for manufacturing the flexible bags from long lengths of film.

2. Description of the Related Art

Conventionally, vertical type forming, filling and sealing machines have been used for putting contents in the form of liquid or paste into bags.

The vertical type forming, filling and sealing machine generally comprises a bag forming guide for forming long lengths of film into tubular shapes, a vertical sealing mechanism for heat sealing mating surfaces at edges of the film formed into tubular shapes along the longitudinal direction of the film to form tubular film, and a horizontal sealing mechanism for heat sealing the tubular film over its entire width. Each of the vertical sealing mechanism and the horizontal sealing mechanism includes a heater bar and a heater receiving bar opposite to each other such that they press and heat the film at the same time to heat seal the opposing inner surfaces of the film.

Contents are supplied into the film below the vertical sealing mechanism and above the horizontal sealing mechanism. While the film is intermittently fed at constant pace, the vertical sealing mechanism heat seals and forms the film into tubular shapes, the contents are supplied thereinto, and then the horizontal sealing mechanism heat seals the film in the width direction, thereby manufacturing flexible bags having the contents enclosed therein.

The flexible bags are successively manufactured in the vertical type forming, filling and sealing machine. Thus, after the horizontal sealing mechanism heat seals the film, the film is cut at the point of the heat sealing in the width direction for division into each bag.

To achieve highly constant amounts of the contents, or to prevent rottenness of the contents due to air present in the flexible bag, the contents may be supplied into the tubular film to a position above the horizontal sealing mechanism and then separated by nipping from the outside the tubular film in which the contents are enclosed.

Especially when the contents are in the form of paste, a pair of squeezing rollers for nipping film from the sides is provided as a mechanism for dividing such contents. The contents in paste form are supplied to a position above the squeezing rollers, and then separated by closing the squeezing rollers. The squeezing rollers in the closed state are rotated to feed the film downward, and a no-filling portion is formed in the area of the film nipped and fed by the squeezing rollers. The no-filling portion is heat sealed by the horizontal sealing mechanism. In this manner, the heat sealing of the film by the horizontal sealing mechanism is favorably performed even for the contents in paste form.

FIGS. 1 to 3 show representative examples of packing with film.

FIG. 1 shows pillow type flexible bag 500. The aforementioned forming, filling and sealing machine is generally used to manufacture pillow type flexible bag 500. Flexible bag 500 includes vertical seal portion 501 which is the portion heat sealed by the vertical sealing mechanism and horizontal seal portions 502 which are the portions heat sealed by the horizontal sealing mechanism.

It is possible to manufacture three-side seal type flexible bag 510 as shown in FIG. 2 by changing the orientation of the horizontal sealing mechanism with respect to the vertical sealing mechanism in the aforementioned forming, filling and sealing machine. Flexible bag 510 also includes vertical seal portion 511 which is the portion heat sealed by the vertical sealing mechanism and horizontal seal portions 512 which are the portions heat sealed by the horizontal sealing mechanism.

In addition, it is possible to manufacture four-side seal type flexible bag 520 as shown in FIG. 3 by providing a second vertical sealing mechanism for the aforementioned forming, filling and sealing machine at the position opposite to the vertical sealing mechanism with the film interposed between them for heat sealing the fold of the film along its longitudinal direction. Flexible bag 520 includes vertical seal portion 523 which is the portion heat sealed by the second vertical sealing mechanism in addition to vertical seal portion 521 and horizontal seal portions 522 similarly to three-side seal type flexible bag 510 shown in FIG. 2.

On the other hand, another form of flexible bags is freestanding bags. Since the freestanding bags such as plastic cases, cans or bottles, can be placed upright on the storefront and fold compact for disposal after the contents thereof are consumed, they have come into widespread use as a packing form replacing the aforementioned ones.

Various forming machines have been proposed to manufacture such freestanding bags, and particularly, Japanese Patent Laid-open Publication No. 11-152104 discloses an apparatus which is an application of the aforementioned vertical type forming, filling and sealing machine. Specifically, the disclosed apparatus has a folding mechanism for folding inward a fold of film at the position opposite to a vertical sealing mechanism with the film interposed between them, and a bottom sealing mechanism for heat sealing two projections of the film formed by folding the film by the folding mechanism to form the bottom of a freestanding bag, added to a forming, filling and sealing machine for manufacturing the aforementioned three-side seal type flexible bag. The forming, filling and sealing machine manufactures freestanding bags in a laid state.

FIG. 4 shows an example of a freestanding bag manufactured by the forming, filling and sealing machine disclosed in Japanese Patent Laid-open Publication No. 11-152104. As shown in FIG. 4, freestanding bag 550 includes two side seal portions 552, top seal portion 551, and bottom seal portion 553. Side seal portions 552 are formed by a horizontal sealing mechanism, top seal portion 551 is formed by the vertical sealing mechanism, and bottom seal portion 553 is formed by the bottom sealing mechanism.

In this manner, the vertical sealing mechanism can be combined with the horizontal sealing mechanism as appropriate to manufacture various forms of flexible bags by using long lengths of film.

In the aforementioned conventional forming, filling and sealing machine, the horizontal sealing mechanism presses and heat seals film with the heater bar and the heater receiving bar as described above. It is necessary to use a heater bar and a heater receiving bar longer than the width of flexible bags to reliably perform heat sealing of the film over the entire width. Flexible bags have various sizes ranging from several centimeters to several tens of centimeters of width depending on the types of contents and the uses of the flexible bags.

As the width of film is greater, the heater bar and the heater receiving bar necessarily press the film in a larger area. An increase in the pressed area of the film means that actual pressure per area applied to the film is reduced as long as the film is subject to the same pressure. As a result, sufficient seal strength cannot be obtained. This is true generally of horizontal seal in the vertical type forming, filling and sealing machine regardless of the form of flexible bags.

Especially when the pillow type flexible bags or freestanding bags are manufactured, film is folded different times in the area of the film heat sealed by the horizontal sealing mechanism. Consequently, a difference in height occurs in the film at the boundary between different thicknesses of the film. The difference in height as well as heat heat sealability or flexibility of the film may cause defective seal at the time of heat sealing by the horizontal sealing mechanism.

Defective seal resulting from such a difference in height is hereinafter described with reference to FIGS. 5a and 5b. FIG. 5a schematically shows a cross section of horizontal seal portion 502 at the time of formation thereof along the width direction of film, together with heater bar 601 and heater receiving bar 602 which constitute part of the horizontal sealing mechanism when pillow type flexible bag 500 shown in FIG. 1 is manufactured. FIG. 5b schematically shows a cross section of side seal portion 552 at the time of formation thereof along the width direction of film, together with heater bar 601 and heater receiving bar 602 which constitute part of the horizontal sealing mechanism when freestanding bag 550 shown in FIG. 4 is manufactured. It should be noted that FIGS. 5a and 5b show the thickness of the film greater than its actual dimension to facilitate understanding of the overlaps of the film.

As shown in FIG. 5a, horizontal seal portion 502 has four thicknesses of the film in the area where vertical seal portion 501 is formed, and two thicknesses of the film in the remaining area. On the other hand, as shown in FIG. 5b, side seal portion 552 has four thicknesses of film in the area where bottom seal portion 553 is formed, and two thicknesses of the film in the remaining area. Silicone rubber 603 is attached to the surface of heater receiving bar 602 opposite to heater bar 601 such that silicone rubber 603 is resiliently deformed with pressure put to the film by heater bar 601 and heater receiving bar 602 to apply force to the entire area in which heat sealing should be performed.

In reality, however, sufficient force may not be applied to cause incomplete heat sealing at the boundaries (areas 610, 611 in FIG. 5a and area 613 in FIG. 5b) between the two thicknesses and the four thicknesses of the film. Such incomplete heat sealing results in leakage of contents to the outside from those boundaries at worst. Particularly, in horizontal seal portion 502 shown in FIG. 5a, a similar problem may also occur in folds 612 of the film.

To prevent the defective seal in the horizontal seal portions caused by an increased size of flexible bags or a difference in height of film as described above, it is contemplated that the horizontal sealing mechanism applies a greater pressure to the film or the film is heated for a longer time period to provide the film with a greater amount of heat.

A greater pressure to the film, however, requires the use of a driving source of a greater output as a driving source for the horizontal sealing mechanism. In connection with this, higher rigidity is needed for the horizontal sealing mechanism including the driving source, which increases the size of the horizontal sealing mechanism including the driving source and thus not preferable. On the other hand, the heating of the film for a longer time period requires a longer time for heat sealing to cause reduced productivity of the flexible bags.

In addition, a greater pressure to the film and the heating of the film for a longer time period mean that the film is caused to be readily sealed. This may bring about defects such as elongation or breakage of the film at the lower end of the heater bar when the film is pressed and heated by the heater bar and the heater receiving bar. The elongation and breakage of the film are phenomena caused by adding the weight of contents to the sealed area of the film in the lower portion of the horizontal sealing mechanism when the horizontal sealing mechanism heat seals the film in the vertical type forming, filling and sealing machine. The elongation or breakage of the film may occur by the pressure itself applied by the horizontal sealing mechanism.

The elongation or breakage of the film at the heat sealing tends to occur when polyethylene film with high heat sealability is used as the film. To prevent the elongation or breakage, flexible bags are generally manufactured by using a laminated film of polyethylene film and nylon film to heat seal the polyethylene films. The use of such a laminated film, however, leads to increased cost of the bag materials.

On the other hand, as the width of flexible bags is greater, the lengths of the heater bar and heater receiving bar of the horizontal sealing mechanism are also greater. When the lengths of the heater bar and heater receiving bar are greater, a slight error of their parallelism causes a difference in applied pressure between one end and the other end of the film in the width direction, resulting in defective seal. Therefore, to maintain the parallelism of the heater bar and the heater receiving bar, it is necessary to improve the accuracy or rigidity of the parts of structures for driving the horizontal sealing mechanism or to provide an additional structure. Consequently, the forming, filling and sealing machine involves an increased manufacturing cost or increased size.

In the forming, filling and sealing machine including squeezing rollers, the squeezing rollers divide contents in film by applying pressure thereto, and the various problems associated with the applied pressure as described above for the horizontal sealing mechanism occur similarly in the squeezing rollers Specifically, a difference in height in film or an increased width of the film partially or generally reduces the pressure applied to the film by the squeezing rollers. As a result, the contents may remain in the area pressurized by the squeezing rollers.

Since the horizontal sealing mechanism heat seals the portion of the film pressed by the squeezing rollers, defective seal may occur if the contents remain in that portion. Even if such a serious problem as defective seal is not produced, the contents remaining in the horizontal seal portion are exposed when the film is cut at the horizontal seal portion for division into each flexible bag, and thus the bag is determined as being nonconforming.

SUMMARY OF THE INVENTION

It is an object of the present invention to provide a method for manufacturing flexible bags and a vertical type forming, filling and sealing machine capable of manufacturing flexible bags readily at high speed even when a difference in height which may obstruct heat sealing of film occurs in the area of film where heat sealing is to be performed or even when a wide film is used.

To achieve the aforementioned object, according to the present invention, there is provided a method for manufacturing a flexible bag accommodating contents using long lengths of film while the film is fed downward, the method comprising the steps of heat sealing both edges of the long lengths of film to form tubular film having a vertical seal portion formed by the heat sealing, heat sealing opposing inner surfaces of the tubular film in its width direction except a portion to form an opening, supplying the contents from the opening into the tubular film, and heat sealing opposing inner surfaces of the tubular film in its width direction at the opening after the supply of the contents.

According the method for manufacturing flexible bags of the present invention, the tubular film is heat sealed in the width direction in two separated steps. Specifically, in the first step, the tubular film is heat sealed except a portion to form an opening for supplying contents before the supply of the contents. In the next step, the opening is heat sealed after the supply of the contents. Since the tubular film is heat sealed in the width direction separately before and after the supply of the contents in this manner, the tubular film need not be heated over the entire width after the supply of the contents but may be heated partially. Thus, the tubular film is not elongated by the weight of the contents at the time of its heat sealing in the width direction after the contents are supplied.

In addition, even when the portion of the film to be heat sealed includes a different number of thicknesses of the film in the width direction, it is possible to set optimal heat sealing conditions such as a level or a duration of applied pressure to the tubular film at the time of heat sealing in consideration of the different thicknesses since the heat sealing of the tubular film in the width direction is performed in the two separated steps.

Therefore, the heat sealing of the tubular film in the width direction is favorably performed regardless of the form or size of flexible bags and the material of the film. Moreover, the heat sealing of the tubular film in the width direction separated in two steps can reduce the area to be heat sealed in each step, thereby reducing the time required for the heat sealing.

According to the present invention, there is provided a vertical type forming, filling and sealing machine for manufacturing a flexible bag accommodating contents using long lengths of film while the film is fed downward, the machine comprising a film shaping mechanism for superposing both edges of the long lengths of film to oppose the same surface thereof, a vertical sealing mechanism for heat sealing the superposed edges of the film in its longitudinal direction to form tubular film having a vertical seal portion formed by the heat sealing, a supply nozzle for supplying the contents from above the tubular film into the tubular film, and two horizontal sealing mechanisms for heat sealing opposing inner surfaces of the tubular film in its width direction. A first horizontal sealing mechanism heat seals the tubular film in its width direction except a portion. The supply nozzle has a lower end located below the first horizontal sealing mechanism. A second horizontal sealing mechanism is placed below the first horizontal sealing mechanism. Particularly, the second horizontal sealing mechanism is configured to heat sealed the opposing inner surfaces of the tubular film in its width direction which are not heat sealed by the first horizontal sealing mechanism when the portion heat sealed by the first horizontal sealing mechanism is fed at a position corresponding to the position of the second horizontal sealing mechanism in the feed direction of the tubular film.

As described above, the vertical forming, filling and sealing machine of the present invention includes, as a sealing mechanism for heat sealing the tubular film in the width direction, the first horizontal sealing mechanism for heat sealing the tubular film except a portion in the width direction and the second horizontal sealing mechanism for heat sealing the remaining portion which is not heat sealed by the first horizontal sealing mechanism. The provision of the two horizontal sealing mechanisms eliminates the need of heating the tubular film over the entire width in heat sealing the tubular film in the width direction. This prevents elongation of the tubular film due to the weight of the contents at the time of thermal seal of the tubular film in the width direction.

In addition, since the second horizontal sealing mechanism is placed below the first horizontal sealing mechanism and the supply nozzle for supplying the contents into the tubular film has the lower end placed between the first horizontal sealing mechanism and the second horizontal sealing mechanism, the first horizontal sealing mechanism heat seals the tubular film before the supply of the contents, and as a result, the heat sealing of the tubular film is stably performed by the first horizontal sealing mechanism. With the two separated sealing mechanisms for heat sealing the tubular film in the width direction, each thermal sealing mechanism may be of small size and an additional structure which would be required in a large horizontal sealing mechanism is not needed, and consequently, a smaller size of the entire machine is achieved.

The aforementioned and other objects, features, and advantages of the present invention will become apparent from the following description with reference to the drawings which illustrate several embodiments of the present invention.

DESCRIPTION OF THE PREFERRED EMBODIMENTS (First Embodiment)

A forming, filling and sealing machine of a first embodiment manufactures pillow type flexible bags into which contents in the form of liquid or paste are filled. Description is first made for the schematic configuration of the forming, filling and sealing machine according to the first embodiment of the present invention with reference to FIGS. 6 and 7.

Figure 1:
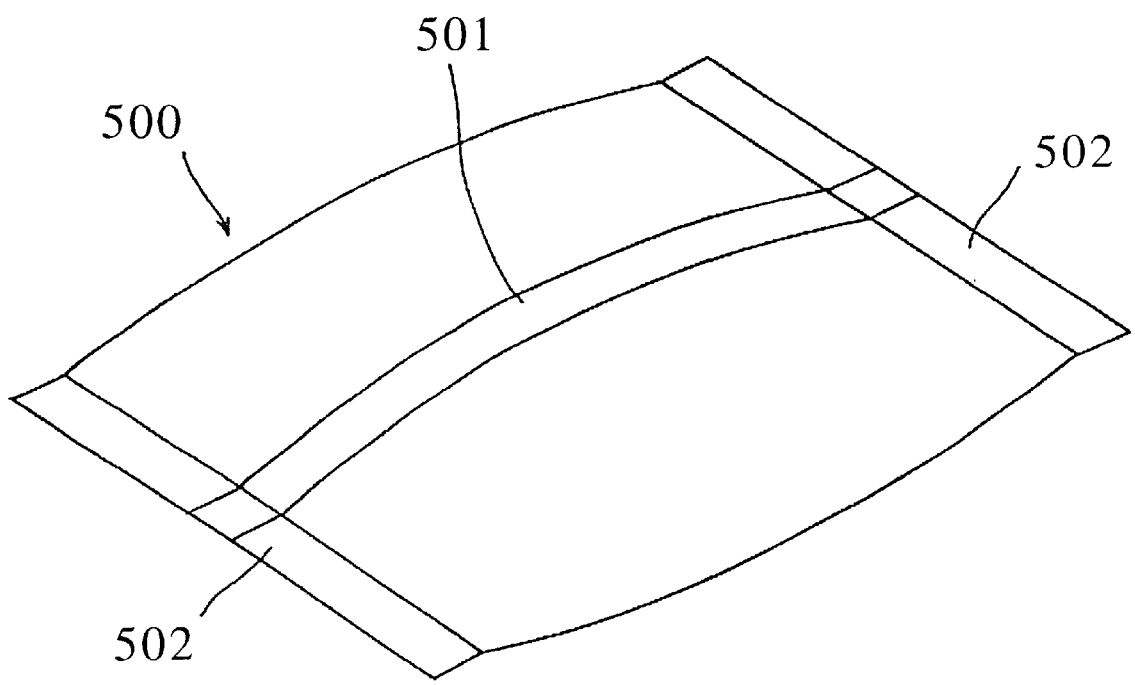
FIG. 1 is a perspective view showing an example of a conventional pillow type flexible bag.
Figure 2:
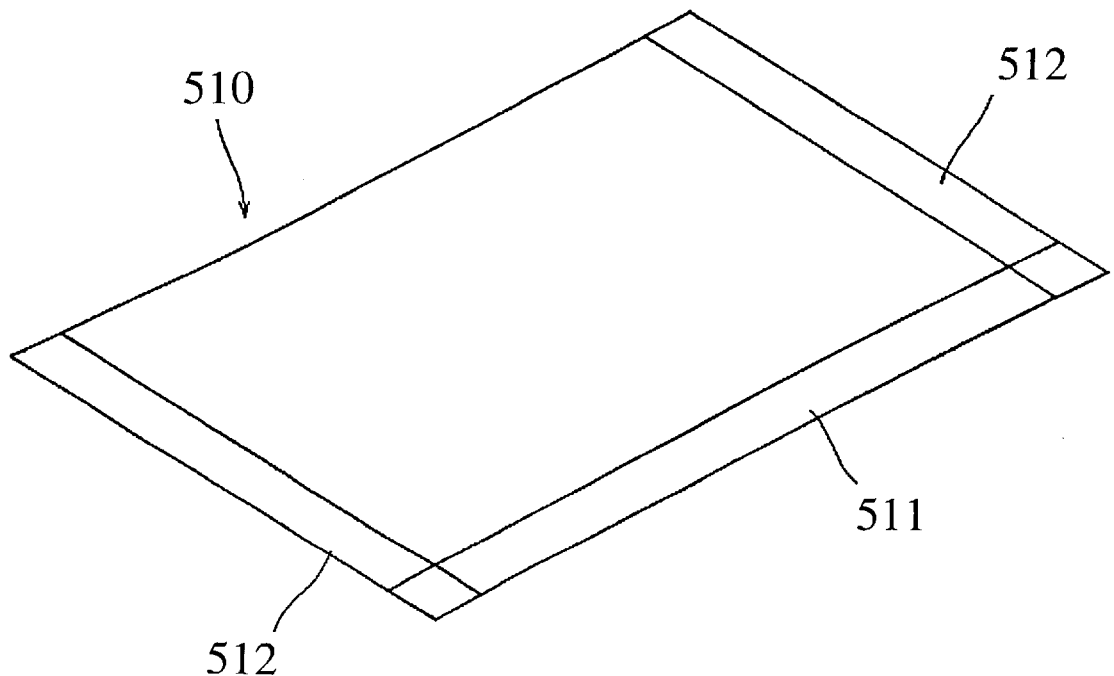
FIG. 2 is a perspective view showing an example of a conventional three-side seal type flexible bag.
Figure 3:
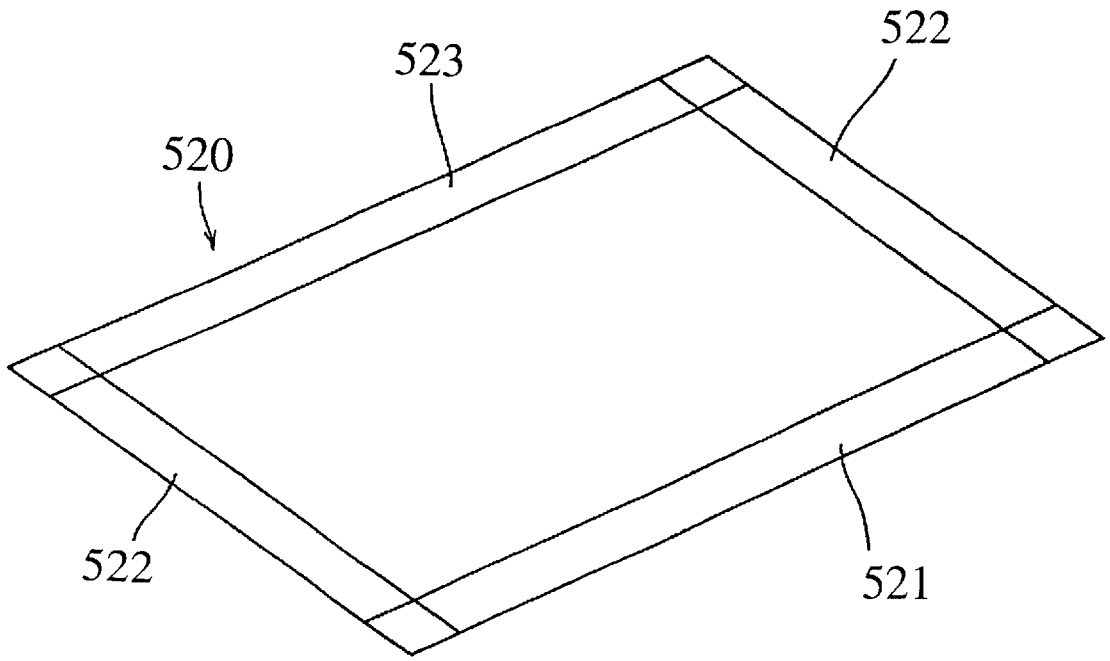
FIG. 3 is a perspective view showing an example of a conventional four-side seal type flexible bag.
Figure 4:
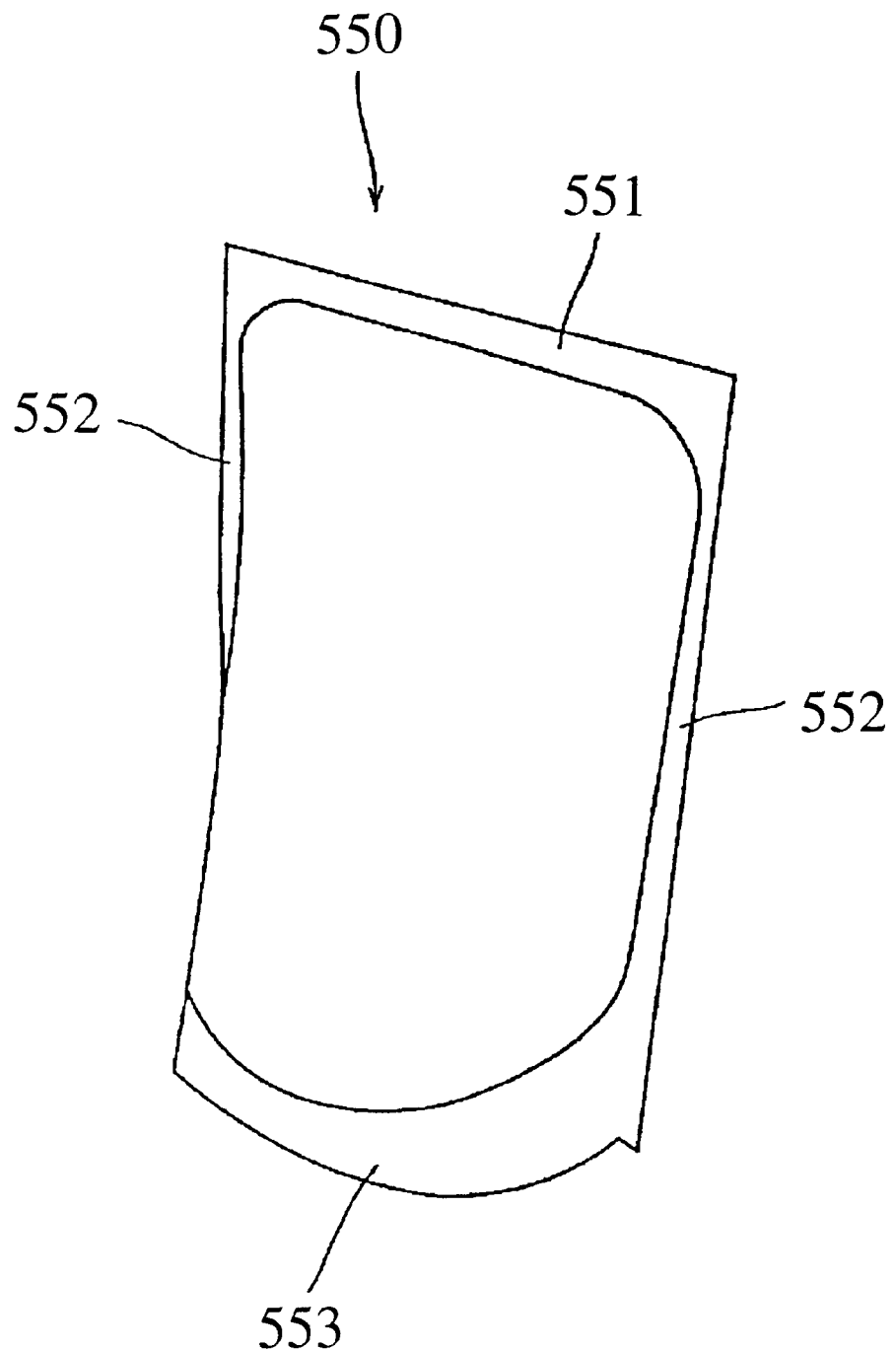
FIG. 4 is a perspective view showing an example of a conventional freestanding bag.
Figure 5A:
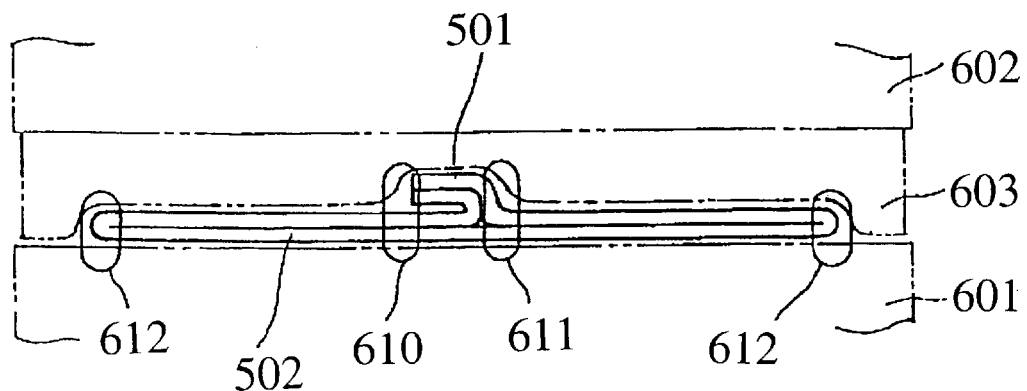
FIG. 5a is a cross section for describing defective seal caused by a difference in height of film in a conventional forming, filling and sealing machine for pillow type flexible bags.
Figure 5B:
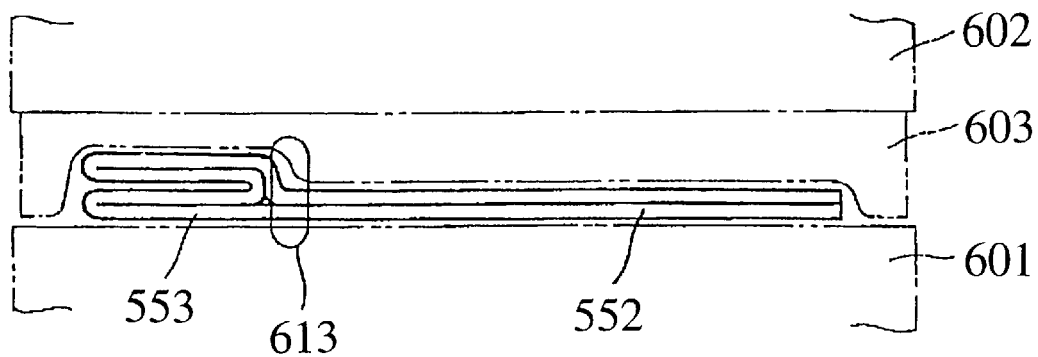
FIG. 5b is a cross section for describing defective seal caused by a difference in height of film in a conventional forming, filling and sealing machine for freestanding bags.
Figure 6:
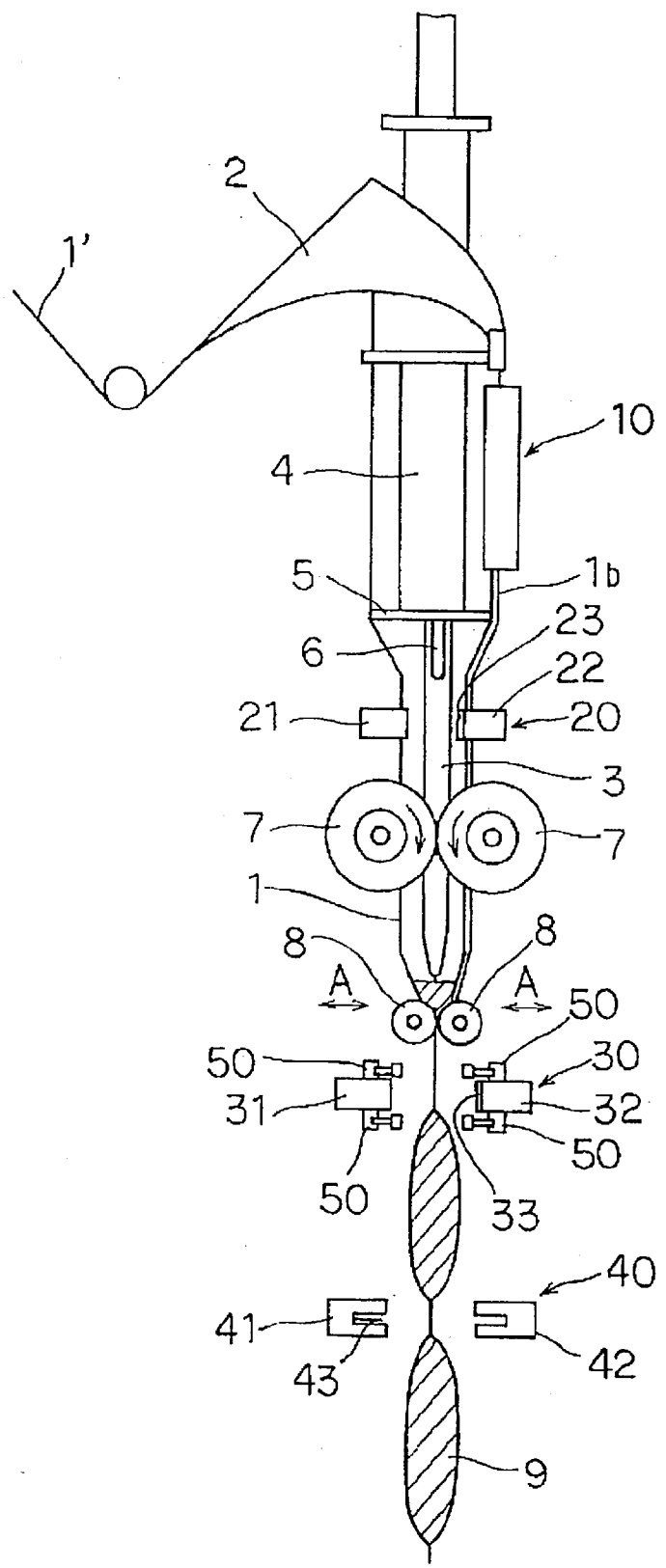
FIG. 6 is a front view showing a vertical type forming, filling and sealing machine according to a first embodiment of the present invention.
Figure 7:
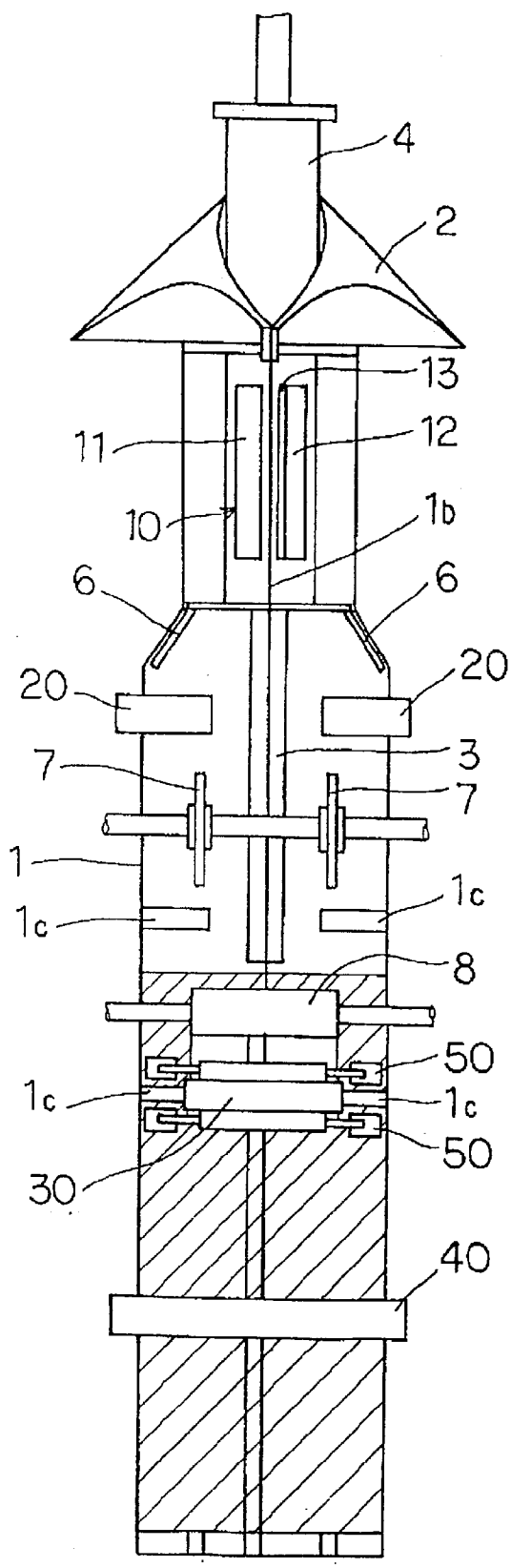
FIG. 7 is a side view of the vertical type forming, filling and sealing machine shown in FIG. 6.

In FIGS. 6 and 7, bag forming guide 2 is provided for forming long lengths of film 1' into tubular shapes by superposing edges to oppose the same surface. Film 1' is wound in roll shape, and fed from the roll and supplied to bag forming guide 2. Film 1' formed into tubular shapes by bag forming guide 2 is fed downward by two feed rollers 7, later described, in a state where it surrounds the periphery of main pipe 4. Supply nozzle 3 passing through main pipe 4 is disposed concentrically with main pipe 4 within main pipe 4. Supply nozzle 3 is provided for supplying contents 9 in liquid or paste form into film 1, and contents 9 (indicated by hatch lines in FIG. 6) are supplied from the top end of supply nozzle 3 and discharged from the bottom end thereof.

Vertical sealing mechanism 10 is disposed below bag forming guide 2 for heat sealing the superposed edges of film 1' formed into tubular shapes by bag forming guide 2 along the longitudinal direction of film 1. Vertical sealing mechanism 10 includes vertical heater bar 11 and vertical heater receiving bar 12 which are oppositely placed with the facing edges of film 1' interposed between them. Pad 13 made of silicone rubber is attached to the surface of vertical heater receiving bar 12 opposite to vertical heater bar 11. Vertical heater bar 11 and vertical heater receiving bar 12 press and heat the facing edges of film 1' to heat seal the edges of film 1', thereby forming vertical seal portion 1b of film 1. In this manner, film 1' is formed into tubular film 1. Since vertical sealing mechanism 10 is similar to a conventional vertical sealing mechanism for use in a typical vertical type forming, filling and sealing machine, description of its detailed configuration and operation is omitted.

Two guide stretchers 6 are attached to flange 5 at the lower end of main pipe 4 below vertical sealing mechanism 10. Guide stretchers 6 are members in rod shape for spreading tubular film 1 from the inside in a direction parallel to a horizontal seal portion of a flexible bag manufactured by the forming, filling and sealing machine. As tubular film 1 passes guide stretchers 6, tubular film 1 is spread from the inside, and especially both sides thereof are made substantially flat.

Below guide stretchers 6, two first horizontal sealing mechanisms 20 are provided at the same levels in the feed direction of tubular film 1 below main pipe 4. First horizontal sealing mechanisms 20 heat seal the facing inner surfaces of the film in predetermined areas along a direction parallel to the width direction of tubular film 1 on both sides of tubular film 1 spread by guide stretchers 6 and made substantially flat.

Each of first horizontal sealing mechanisms 20 includes first horizontal heater bar 21 and first horizontal heater receiving bar 22 which are oppositely disposed on both sides of tubular film 1 with tubular film 1 interposed between them. First horizontal heater bar 21 and first horizontal heater receiving bar 22 are oppositely moved by a driving source, not shown, and first horizontal heater bars 21 and first horizontal heater receiving bars 22 press and heat tubular film 1 to heat seal both sides of tubular film 1.

In this manner, first horizontal seal portions 1c are formed on both sides of tubular film 1. The area between two horizontal seal portions 1c formed by first horizontal sealing mechanisms 20 serves as an opening for receiving contents 9 from supply nozzle 3, as later described. Pad 23 made of silicone rubber is attached to the surface of first horizontal heater receiving bar 22 opposite to first horizontal heater bar 21.

Two feed rollers 7 are provided below first horizontal sealing mechanisms 20 for feeding tubular film 1 downward by rotation with tubular film 1 sandwiched between them. A pair of squeezing rollers 8 is provided below feed rollers 7 and under the lower end of supply nozzle 3 such that they are oppositely placed with tubular film 1 interposed between them and rotated in synchronization with the rotation of feed rollers 7. Squeezing rollers 8 are oppositely moved in the directions indicated by arrows A shown in FIG. 6 by a driving source, not shown, and rotated with tubular film 1 sandwiched between them, thereby dividing contents 9 supplied into tubular film 1 from supply nozzle 3.

Squeezing rollers 8 are provided for the purpose of removing contents 9 from the area of tubular film 1 heat sealed by second horizontal sealing mechanism 30, later described, prior to division of contents 9 into each fixed amount and heat sealing of tubular film 1 by second horizontal sealing mechanism 30. Thus, squeezing rollers 8 need not nip tubular film 1 over its entire width, and it is necessary only that squeezing rollers 8 have at least a length required to nip tubular film 1 over the area between first horizontal seal portions 1c formed by first horizontal sealing mechanisms 20.

Supply nozzle 3 extends downward between two first horizontal sealing mechanisms 20. The lower end of supply nozzle 3 serving as a discharge port of contents 9 is located below first horizontal sealing mechanisms 20. Contents 9 are supplied from the opening which is not heat sealed by first horizontal sealing mechanisms 20. Thus, since contents 9 are not supplied at the position where tubular film 1 is heat sealed by first horizontal sealing mechanisms 20, first horizontal heater bars 21 and first horizontal heater receiving bars 22 do not sandwich contents 9 when first horizontal sealing mechanisms 20 heat seals tubular film 1.

Second horizontal sealing mechanism 30 is provided below squeezing rollers 8 for heat sealing the facing inner surfaces of the film along the width direction of tubular film 1 in the area where horizontal seal portions 1c of tubular film 1 is formed except horizontal seal portions 1c. Second horizontal sealing mechanism 30 includes second horizontal heater bar 31 and second horizontal heater receiving bar 32 which are oppositely disposed with tubular film 1 interposed between them. Second horizontal heater bar 31 and second horizontal heater receiving bar 32 are oppositely moved by a driving source, not shown, and second horizontal heater bar 31 and second horizontal heater receiving bar 32 press and heat tubular film 1 to perform heat sealing of the aforementioned area of tubular film 1. Pad 33 made of silicone rubber is attached to the surface of second horizontal heater receiving bar 32 opposite to second horizontal heater bar 31.

Since second horizontal heater bar 31 and second horizontal heater receiving bar 32 heat seal the area where horizontal seal portions 1c of tubular film 1 is formed except horizontal seal portions 1c as described above, tubular film 1 need not be heat sealed over the entire width. Thus, similarly to squeezing rollers 8, it is necessary only that second horizontal heater bar 31 and second horizontal heater receiving bar 32 have at least a length required to press and heat tubular film 1 in the area between first horizontal seal portions 1c formed by first horizontal sealing mechanisms 20, and they are located in the central portion in the width direction of tubular film 1. To prevent contents 9 divided by the operation of squeezing rollers 8 from flowing into the area between horizontal seal portions 1c from both sides of squeezing rollers 8, it is desirable that second horizontal sealing mechanism 30 is placed as close as possible to squeezing rollers 8 without obstructing the operations of squeezing rollers 8 and second horizontal sealing mechanism 30.

Wrinkle smoothing mechanisms 50 are attached to the top and bottom of second horizontal heater bar 31 and second horizontal heater receiving bar 32 for preventing sags in the area heat sealed by second horizontal sealing mechanism 30.

Figure 8:
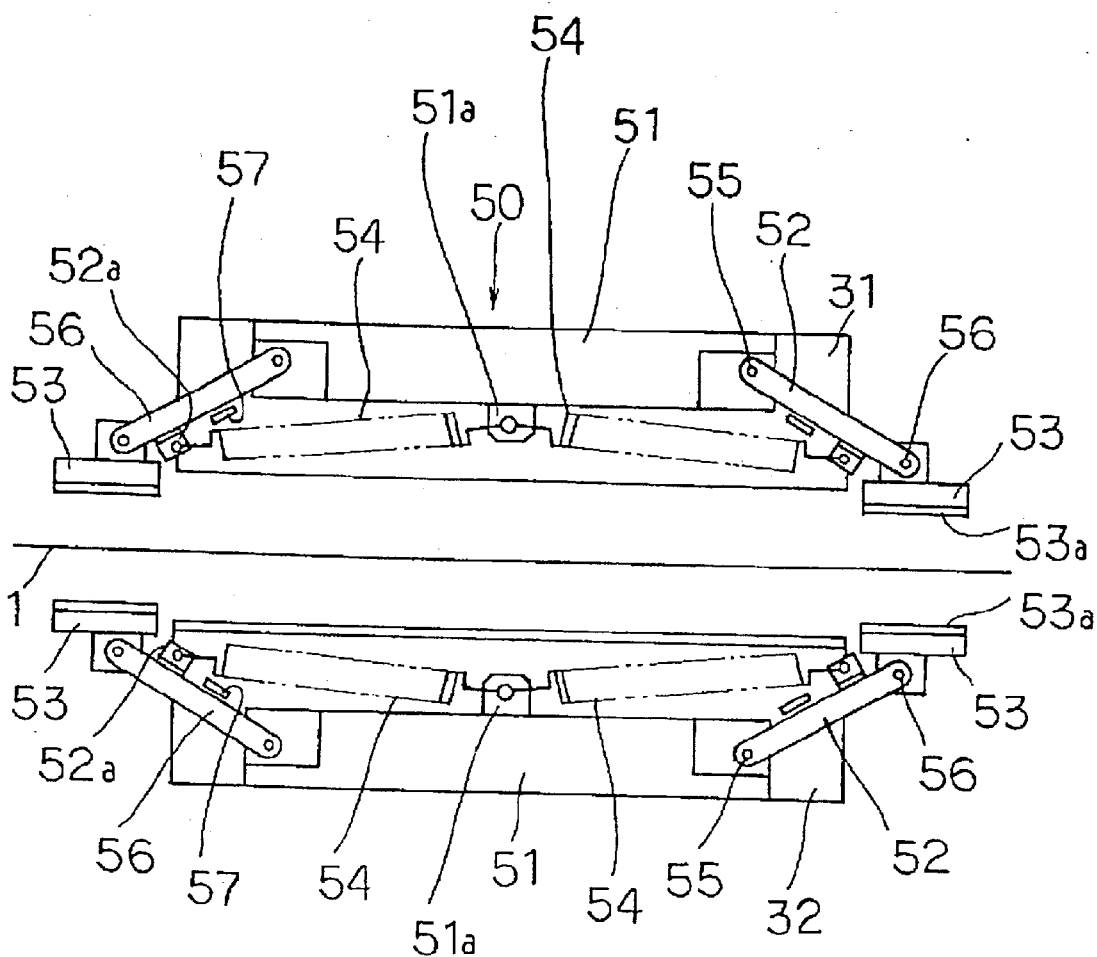
FIG. 8 is a top view showing a wrinkle smoothing mechanism viewed from the top of a second horizontal sealing mechanism shown in FIG. 6.

Wrinkle smoothing mechanisms 50 are described with reference to FIG. 8 which is a top view of wrinkle smoothing mechanisms 50 viewed from the top of second horizontal sealing mechanism 30. Support member 51 is fixed to the top surface of second horizontal heater bar 31. Connecting levers 52 are supported by shafts 55 at both ends of support member 51 in the width direction of tubular film 1 such that each lever 52 is swingable about shaft 55 in a plane perpendicular to the feed direction of tubular film 1 between second horizontal heater bar 31 and second horizontal heater receiving bar 32.

Second horizontal heater bar 31 is provided with stoppers 57 for limiting the swing ranges of respective connecting levers 52 in the direction toward the center of tubular film 1 in the width direction. Pressurizing members 53 each having a flat front surface to press tubular film 1 are supported by shafts 56 at ends of respective connecting levers 52 such that each member 53 is swingable about shaft 56 in a plane perpendicular to the feed direction of tubular film 1 between second horizontal heater bar 31 and second horizontal heater receiving bar 32. Elastic pads 53a formed of an elastic member such as rubber are attached to the front surfaces of respective pressurizing members 53.

Each connecting lever 52 is provided with spring eyelet 52a on which one hook of spring 54 is hung. On the other hand, support member 51 is provided with spring eyelet 51a on which the other hook of spring 54 is hung. Thus, connecting levers 52 are pulled by springs 54 toward the center of tubular film 1 in the width direction and abut on stoppers 57. When connecting levers 52 abut on stoppers 57, the front surfaces of pressurizing members 53 project from the surface of second horizontal heater bar 31 opposite to second horizontal heater receiving bar 32 toward tubular film 1.

A structure similar to the aforementioned one is provided symmetrically on the top surface of second horizontal heater receiving bar 32. These two structures are paired to form one wrinkle smoothing mechanism 50. Wrinkle smoothing mechanism 50 is provided also on the bottom surfaces of second horizontal heater bar 31 and second horizontal heater receiving bar 32.

With the aforementioned configuration, as second horizontal heater bar 31 approaches second horizontal heater receiving bar 32, pressurizing members 53 opposite to each other sandwich both ends of tubular film 1 in the width direction before second horizontal heater bar 31 and second horizontal heater receiving bar 32 come in contact with tubular film 1. As second horizontal heater bar 31 further approaches second horizontal heater receiving bar 32, pressurizing members 53 move outward in the width direction of tubular film 1 due to their pressing forces against the tension of spring 54 with tubular film 1 sandwiched between them. Since elastic pads 53a are attached to the fronts of pressurizing members 53, the friction between elastic pads 53a and tubular film 1 causes both ends of tubular film 1 in the width direction to be pulled outward as pressurizing members 53 are moved. In this manner, tubular film 1 is pulled in its width direction, and in this sate, second horizontal heater bar 31 and second horizontal heater receiving bar 32 press tubular film 1. Thus, tubular film 1 is heat sealed by second horizontal sealing mechanism 30 in a state where sags are eliminated in the area of tubular film 1 heat sealed by second horizontal sealing mechanism 30.

If the friction between elastic pads 53a and tubular film 1 is too large, the movement of pressurizing members 53 elongates tubular film 1 in the width direction. To avoid such a dimensional change in tubular film 1, it is desirable to select the material of elastic pads 53a such that the friction between elastic pads 53a and tubular film 1 is smaller than a force required to elongate tubular film 1 in the width direction.

Referring again to FIGS. 6 and 7, cutting mechanism 40 is provided below second horizontal sealing mechanism 30 for cooling the area of tubular film 1 heat sealed by second horizontal sealing mechanism 30 and at the same time cutting tubular film 1 in its width direction. Cutting mechanism 40 includes two cooling bars 41, 42 oppositely disposed with tubular film 1 interposed between them. Cooling bars 41, 42 are oppositely moved by a driving source, not shown. Two cooling bars 41, 42 press tubular film 1 to dissipate heat of tubular film 1 to cooling bars 41, 42, thereby cooling tubular film 1.

One cooling bar 41 is provided with cutting blade 43 capable of back-and-forth motions with respect to other cooling bar 42. While cooling bars 41, 42 sandwich tubular film 1, cutting blade 43 is moved forward and projects from cooling bar 41 to cut tubular film 1. A groove is formed in the surface of cooling bar 42 opposite to cooling bar 41 for receiving cutting blade 43 projecting from cooling bar 41 at the cutting of tubular film 1.

Second horizontal sealing mechanism 30 and cutting mechanism 40 are placed vertically such that the distance between the centers in the feed direction of tubular film 1 is equal to the entire length of a flexible bag to be manufactured (the length in the vertical seal direction).

Next, description is made for steps of manufacturing flexible bags with the forming, filling and sealing machine of the embodiment with reference to FIGS. 9a to 9e and FIGS. 10a to 10e. For simplification, description is made mainly for the operations of squeezing rollers 8, second horizontal sealing mechanism 30, and cutting mechanism 40 after the completion of several steps. In these figures, wrinkle smoothing mechanisms 50 are omitted.

Figure 9:
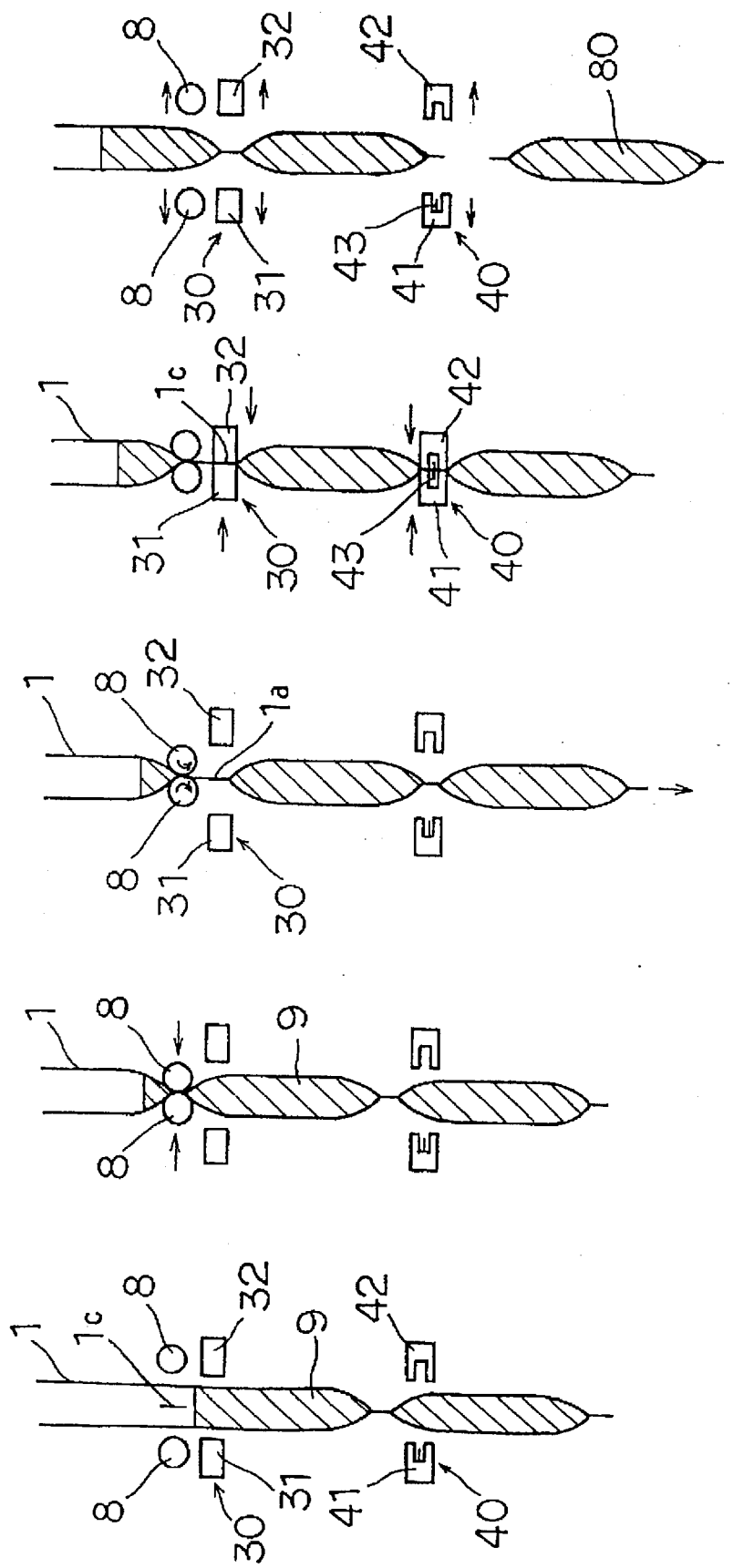
FIGS. 9a to 9e are diagrams for describing steps of manufacturing a flexible bag by the vertical type forming, filling and sealing machine shown in FIG. 6 when tubular film is viewed from the front.
Figure 10:
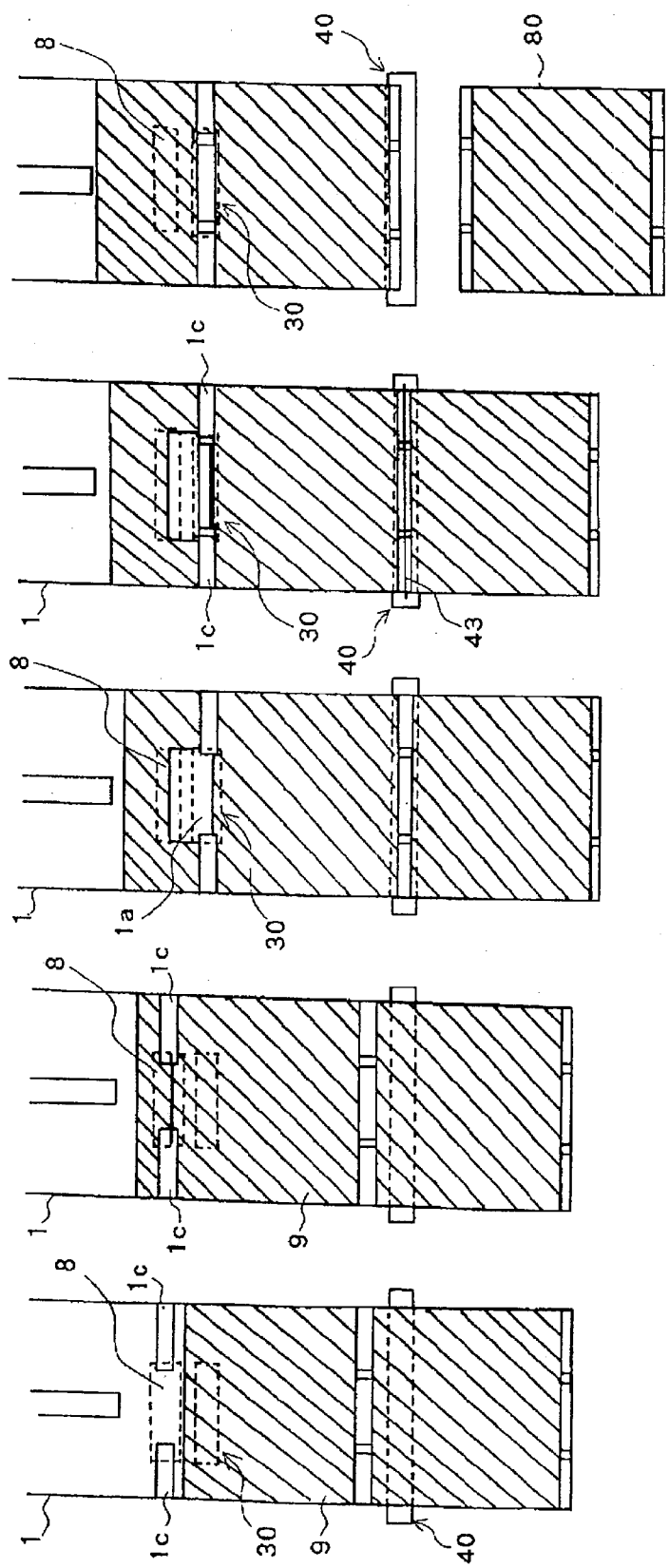
FIGS. 10a to 10e are diagrams for describing steps of manufacturing a flexible bag by the vertical type forming, filling and sealing machine shown in FIG. 6 when tubular film is viewed from the side.
Figure 11:
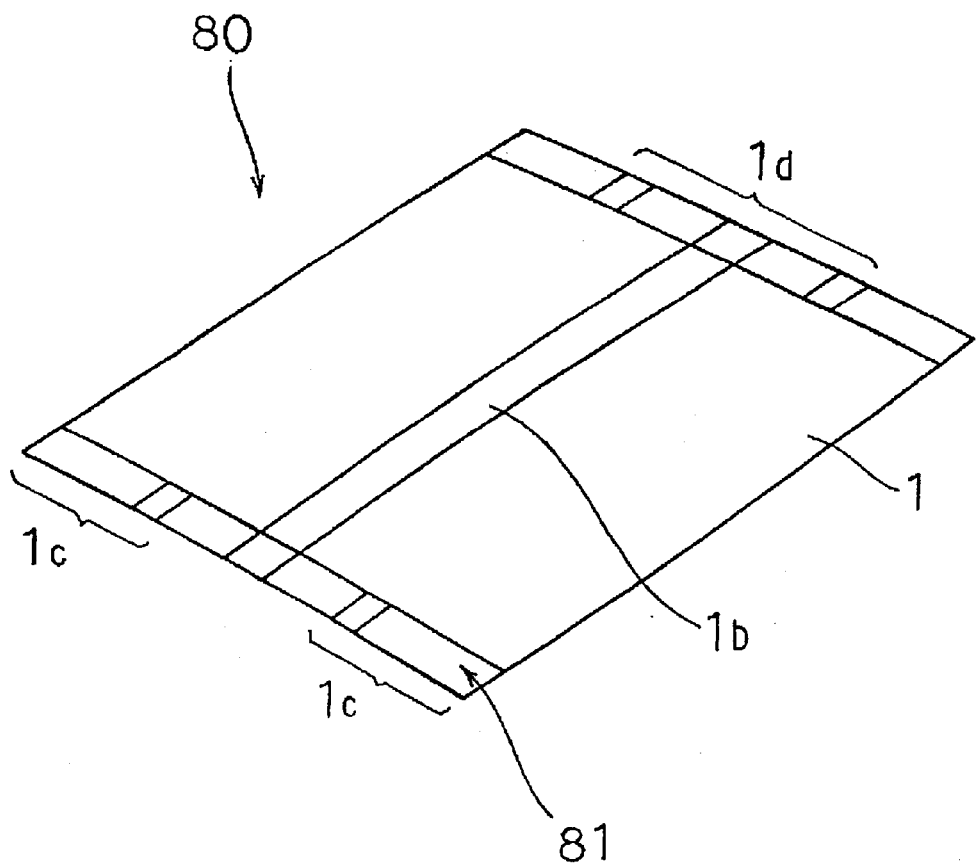
FIG. 11 is a perspective view showing a pillow type flexible bag manufactured by the vertical type forming, filling and sealing machine shown in FIG. 6.

In FIGS. 9a and 10a, all of squeezing rollers 8, second horizontal sealing mechanism 30, and cutting mechanism 40 are opened, that is, not in contact with tubular film 1. Tubular film 1 has first horizontal seal portions 1c formed therein. The feed of tubular film 1 is stopped at the point where first horizontal seal portions 1c are located between squeezing rollers 8.

Contents 9 are successively supplied from supply nozzle 3 (see FIG. 6) into tubular film 1. When the position of the top of contents 9 becomes higher than that of squeezing rollers 8, squeezing rollers 8 are closed to divide contents 9 in tubular film 1 as shown in FIGS. 9b and 10b. The detection of the timing in closing squeezing rollers 8, that is, the detection whether the position of supplied contents 9 becomes higher than that of squeezing rollers 8 can be made, for example, by detecting contents 9 with an optical sensor, not shown.

With this state maintained, squeezing rollers 8 are rotated to feed tubular film 1 downward as shown in FIGS. 9c and 10c. Contents 9 are removed by squeezing rollers 8 in the area nipped by squeezing rollers 8, and no-filling portion 1a is formed in the area between first horizontal seal portions 1c formed in both sides of tubular film 1 in the width direction. When tubular film 1 is fed to the point where no-filling portion 1a is located between second horizontal heater bar 31 and second horizontal heater receiving bar 32 of second horizontal sealing mechanism 30, the feed of tubular film 1 is stopped, and then second horizontal sealing mechanism 30 and cutting mechanism 40 are operated as shown in FIGS. 9d and 10d.

The operation of second horizontal sealing mechanism 30 refers to closing second horizontal heater bar 31 and second horizontal heater receiving bar 32 to press and heat tubular film 1. The opposing surfaces of tubular film 1 are heat sealed in the area between first horizontal seal portions 1c of tubular film 1, and as a result, the portion of tubular film 1 where first horizontal seal portions 1c are formed is heat sealed over the entire width. At this point, the portion of tubular film 1 heat sealed by second horizontal sealing mechanism 30 is subject to heat sealing with sags removed since wrinkle smoothing mechanisms 50 are provided for second horizontal sealing mechanism 30 as described above with reference to FIG. 8. Consequently, the heat sealing of tubular film 1 by second horizontal sealing mechanism 30 is favorably performed.

On the other hand, the operation of cutting mechanism 40 refers to pressing tubular film 1 by closing two cooling bars 41, 42, and after that state maintained for a predetermined time period, moving cutting blade 43 forward. When first horizontal seal portions 1c are located between second horizontal heater bar 31 and second horizontal heater receiving bar 32, a horizontal seal portion formed in tubular film 1 by first horizontal sealing mechanisms 20 and second horizontal sealing mechanism 30 in the operation cycle prior to the operation cycle in FIGS. 9a to 9e and FIGS. 10a to 10e is placed between cooling bars 41, 42.

Thus, the pressing of tubular film 1 by cooling bars 41, 42 cools the horizontal seal portion, particularly the portion heat sealed by second horizontal sealing mechanism 30 in which heat at the heat sealing still remains. Cutting blade 43 is moved forward to cut tubular film 1 in the width direction of tubular film 1 at the horizontal seal portion.

Thereafter, as shown in FIGS. 9e and 10e, squeezing rollers 8, second horizontal heater bar 31 and second horizontal heater receiving bar 32 of second horizontal sealing mechanism 30, and cooling bars 41, 42 of cutting mechanism 40 are opened. The opening of cooling bars 41, 42 releases the holding of tubular film 1 by cutting mechanism 40, thereby obtaining flexible bag 80.

When tubular film 1 is again fed downward to be in the state shown in FIGS. 9a and 10a, the aforementioned series of operations are repeated, and flexible bag 80 is successively manufactured.

Flexible bag 80 includes vertical seal portion 1b along the longitudinal direction of tubular film 1 and two horizontal seal portions 81 along the width direction of tubular film 1, and vertical seal portion 1b and horizontal seal portions 81 hermetically seal tubular film 1. Vertical seal portion 1b is the portion formed by heat sealing tubular film 1 by vertical sealing mechanism 10 (FIG. 6), while horizontal seal portions 81 are the portions formed by heat sealing tubular film 1 by first and second horizontal sealing mechanisms 20, 30 (FIG. 6). Especially, each horizontal seal portion 81 comprises first horizontal seal portions 1c which are the portions heat sealed by first horizontal sealing mechanisms 20 and second horizontal seal portion id which is the portion heat sealed by second horizontal sealing mechanism 30, and both ends of second horizontal seal portion 1d are overlaid on first horizontal seal portions 1c.

Second horizontal seal portion 1d is formed by second horizontal sealing mechanism 30. The portion heat sealed by second horizontal sealing mechanism 30 is not cooled yet in the state where second horizontal heater bar 31 and second horizontal heater receiving bar 32 are opened as shown in FIGS. 9e and 10e. Thus, tubular film 1 is softened in that portion. If the weight of contents 9 is over the softened portion of tubular film 1, tubular film 1 is elongated to change the dimensions.

In the embodiment, however, second horizontal sealing mechanism 30 heat seals only the central portion of tubular film 1 in the width direction, and both sides thereof have already been heat sealed by first horizontal sealing mechanisms 20. First horizontal seal portions 1c which are the portions heat sealed by first horizontal sealing mechanisms 20 are sufficiently solidified by the time tubular film 1 is fed downward to reach the position of second horizontal sealing mechanism 30. Even if second horizontal heater bar 31 and second horizontal heater receiving bar 32 are opened while the portion heat sealed by second horizontal sealing mechanism 30 is still softened, the weight of contents 9 is borne by first horizontal seal portions 1c to prevent tubular film 1 from being elongated.

The portion heat sealed by second horizontal sealing mechanism 30 includes vertical seal portion 1b, and vertical seal portion 1b has four thicknesses of the film. Heat sealing of tubular film 1 with great pressure is required to reliably perform heat sealing of the boundary between the four thicknesses and two thicknesses of the film. In this case, new problems occur as described above, such as a larger size of the horizontal sealing mechanism including the driving source, or breakage of tubular film 1.

To solve the problems, in the embodiment, tubular film 1 is heat sealed over the entire width by two horizontal sealing mechanisms, that is, first horizontal sealing mechanisms 20 for heat sealing both sides of tubular film 1 and second horizontal sealing mechanism 30 for heat sealing the central area of tubular film 1. Since this configuration allows each of horizontal sealing mechanisms 20, 30 to be reduced in size, the horizontal sealing mechanism including the driving source can be reduced in size totally even when two horizontal sealing mechanisms 20, 30 are used. This is particularly effective for manufacturing large flexible bags, for example with a width of 50 cm.

The use of two horizontal sealing mechanisms 20, 30 for heat sealing tubular film 1 over the entire width allows a reduced length of each of horizontal heater bars 21, 31 and horizontal heater receiving bars 22, 32 of horizontal sealing mechanisms 20, 30. Thus, even when the parallelism between horizontal heater bars 21, 31 and horizontal heater receiving bars 22, 32 are not precisely set, localized contact of horizontal heater bars 21, 31 and horizontal heater receiving bars 22, 32 with tubular film 1 does not occur. For this reason, it is not necessary to improve the accuracy or rigidity of the parts of structures for driving the horizontal sealing mechanism or to provide an additional structure in order to maintain parallelism between horizontal heater bars 21, 31 and horizontal hater receiving bars 22, 32.

In addition, the use of two horizontal sealing mechanisms 20, 30 for heat sealing tubular film 1 means that each of horizontal sealing mechanisms 20, 30 performs heat sealing on a reduced area in tubular film 1. This reduces the time taken for heat sealing as compared with heat sealing of tubular film 1 over the entire width by a single horizontal sealing mechanism. As a result, flexible bags can be manufactured more efficiently.

Since the entire area heat sealed by first horizontal sealing mechanisms 20 has two thicknesses of the film, and first horizontal sealing mechanisms 20 heat seal tubular film 1 before contents 9 are supplied thereinto, tubular film 1 can be heat sealed even reliably with small pressure. On the other hand, since the area heat sealed by second horizontal sealing mechanism 30 partially has four thicknesses of the film and second horizontal sealing mechanism 30 heat seals the area in tubular film 1 in which contents 9 are removed by squeezing rollers 8 after contents 9 are supplied into tubular film 1, tubular film 1 needs to be heat sealed with a greater pressure than is applied by fist horizontal sealing mechanism 20.

The use of two horizontal sealing mechanisms 20, 30, however, allows appropriate setting of pressure to tubular film 1 in accordance with the state of tubular film 1. It is thus possible to prevent breakage of tubular film 1 at the pressing of tubular film 1.

The aforementioned effects of preventing the elongation of tubular film 1 due to the weight of contents 9 when second horizontal heater bar 31 and second horizontal heater receiving bars 32 are opened, and preventing of the breakage of tubular film 1 when horizontal sealing mechanisms 20, 30 perform heat sealing eliminate the need of using a laminated film of polyethylene film and nylon film as a bag material. Consequently, limitations on bag materials are relaxed to permit selection of bag materials from among various heat sealable films.

Second horizontal sealing mechanism 30 heat seals the central portion of tubular film 1 in the width direction after contents 9 are supplied thereinto. In the embodiment, squeezing rollers 8 are used to remove contents 9 from the area heat sealed by second horizontal sealing mechanism 30, and the same as second horizontal sealing mechanism 30 is true of squeezing rollers 8. Specifically, since it is necessary only that squeezing rollers 8 remove contents 9 from the area heat sealed by second horizontal sealing mechanism 30, at least a length equal to second horizontal heater bar 31 and second horizontal heater receiving bar 32 of second horizontal sealing mechanism 30 is good enough for squeezing rollers 8.

Thus, as compared with a case where tubular film 1 is sandwiched over the entire width, tubular film 1 receives a higher pressure by squeezing rollers 8 even when the same force is applied to sandwich tubular film 1. As a result, contents 9 can be more favorably removed from the area to be heat sealed by second horizontal sealing mechanism 30. Contents 9 are not exposed even when tubular film 1 is cut at the area heat sealed by second horizontal sealing mechanism 30 to divide tubular film 1 into each flexible bag.

Squeezing rollers 8 are effective means for removing a filler from the area in tubular film 1 which is heat sealed by second horizontal sealing mechanism 30 when contents 9 have high viscosity. Squeezing rollers 8, however, need not be provided when contents 9 have low viscosity and can be removed by closing second horizontal heater bar 31 and second horizontal heater receiving bar 32 of second horizontal sealing mechanism 30. In this case, since contents 9 have low viscosity, air bubbles may occur in contents 9 by closing second horizontal heater bar 31 and second horizontal heater receiving bar 32 and enter a flexible bag.

Figure 12:
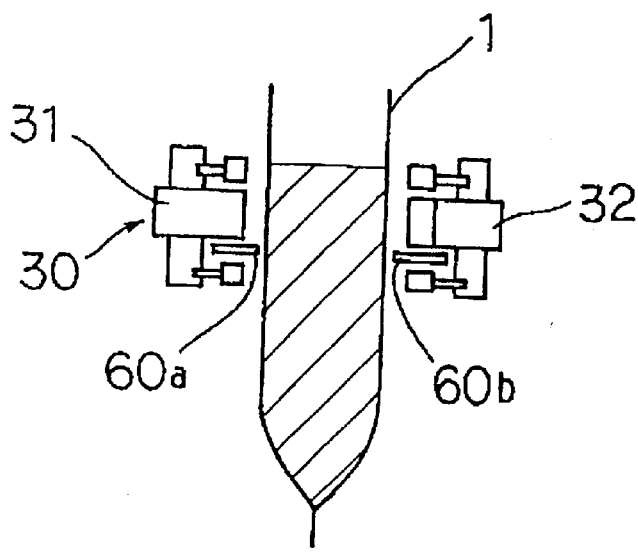
FIG. 12 is a diagram showing a modification of the second horizontal sealing mechanism.

When contents 9 have low viscosity and squeezing rollers 8 for division of contents 9 are not provided, it is desirable to provide shutters 60a, 60b directly below second horizontal heater bar 31 and second horizontal heater receiving bar 32 for nipping tubular film 1 from the outside and closing such that the inner surfaces of the film are brought into close contact with each other at the lower end of the area (opening) of tubular film 1 which is not heat sealed by first horizontal sealing mechanisms 20, as shown in FIG. 12. Shutters 60a, 60b are provided to be movable oppositely, and formed to close before second horizontal heater bar 31 and second horizontal heater receiving bar 32 are closed. Since shutters 60a, 60b are already closed when second horizontal heater bar 31 and second horizontal heater receiving bar 32 are closed, air bubbles, if generated by closing second horizontal heater bar 31 and second horizontal heater receiving bar 32, do not move below shutters 60a, 60b. It is thus possible to effectively prevent the air bubbles from entering a flexible bag.

In the aforementioned embodiment, first horizontal sealing mechanisms 20 heat seal both ends of tubular film 1 in the width direction. For favorable heat sealing of both ends of tubular film 1 in the width direction, it is preferable that tubular film 1 has a minimized bulge in the moving direction of first horizontal heater bar 31 and first horizontal heater receiving bar 22 and tubular film 1 is made flat. Supply nozzle 3 disposed in tubular film 1, however, makes it impossible to made tubular film 1 completely flat. Thus, as shown in FIG. 13, a plurality of supply nozzles 3a, 3b may be formed and used to supply a filler.

Figure 13:
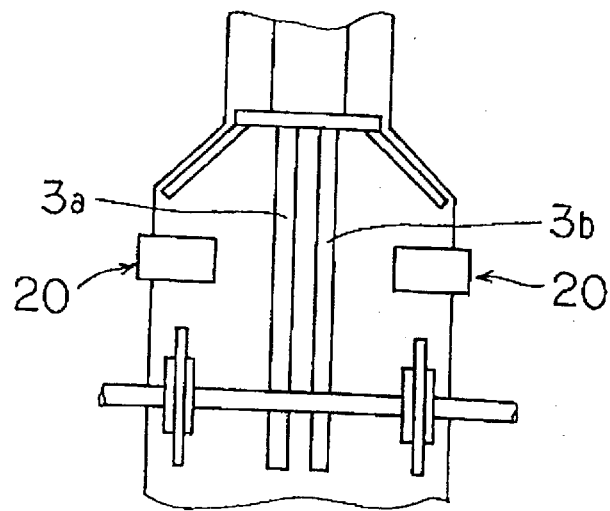
FIG. 13 is a diagram showing a modification of a supply nozzle.

The total area of the cross sections of supply nozzles 3a, 3b shown in FIG. 13 is equal to the cross section of one supply nozzle 3 shown in FIG. 6. Thus, the diameters of supply nozzles 3a, 3b can be reduced without degrading the capability of supplying a filler. As a result, tubular film 1 can be made flatter at the positions where heat sealing is performed by first horizontal sealing mechanisms 20 to allow more favorable heat sealing of both ends of tubular film 1 in the width direction by first horizontal sealing mechanisms 20.

Figure 14:
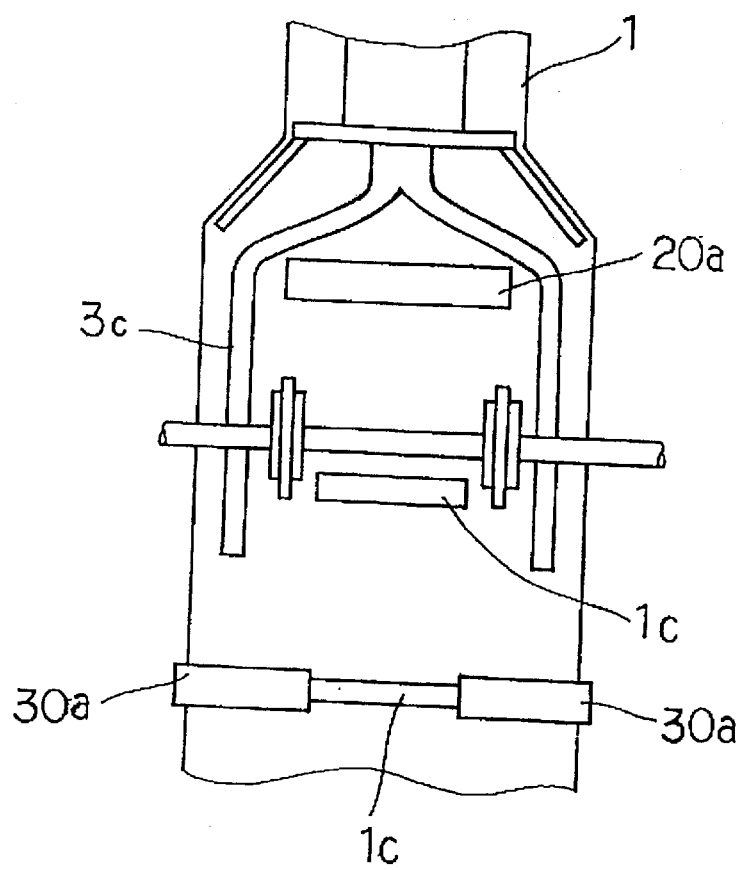
FIG. 14 is a diagram showing an example of a structure in which the heat sealing positions by a first horizontal sealing mechanism and a second horizontal sealing mechanism are interchanged.

In addition, while the embodiment has shown an example where the central portion of tubular film 1 in the width direction is heat sealed after both ends thereof are heat sealed, the order may be reversed. Specifically, as shown in FIG. 14, first horizontal sealing mechanism 20a heat seals the central portion of tubular film 1 in the width direction and second horizontal sealing mechanisms 30a heat seal both ends of tubular film 1 in the width direction. In this manner, first horizontal sealing mechanism 20a heat seals the central portion of tubular film 1 in the width direction before a filler is supplied thereto, while second horizontal sealing mechanisms 30a heat seal both ends of tubular film 1 in the width direction after the filler is supplied thereto.

When a pillow type flexible bag is manufactured, vertical seal portion 1b (see FIG. 7) is located at the center of tubular film 1 in the width direction. That portion has four thicknesses of the film in which insufficient heat sealing tends to occur as described above. The area including vertical seal portion 1b can be heat sealed more stably by heat sealing the center of tubular film 1 in the width direction before a filler is supplied thereto.

In the configuration shown in FIG. 14, first horizontal seal portion 1c which is the heat sealed portion at the center of tubular film 1 in the width direction is located between first horizontal sealing mechanism 20a and second horizontal sealing mechanisms 30a. Thus, supply pipe 3c is bifurcated into two above first horizontal sealing mechanism 20a and the two extend downward on both sides of first horizontal sealing mechanism 20a. The aforementioned squeezing rollers and shutters are omitted in FIG. 14. The squeezing rollers and shutters are disposed as required at both ends of tubular film 1 in the width direction in connection with second horizontal sealing mechanisms 30a.

Figure 15:
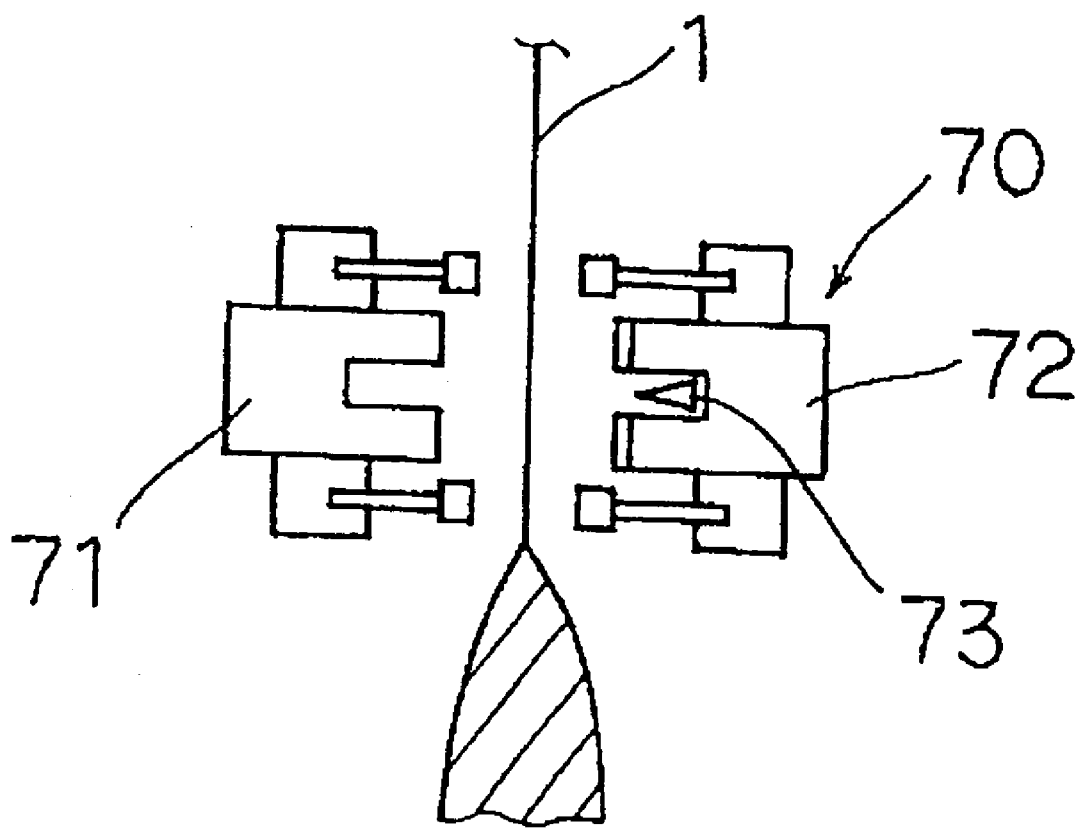
FIG. 15 is a diagram showing an example of the second horizontal sealing mechanism which incorporates a cutting tooth.

Referring again to FIG. 6, the configuration shown in FIG. 6 includes second horizontal sealing mechanism 30 and cutting mechanism 40 individually provided. Cutting blade 43 of cutting mechanism 40, however, may be incorporated into second horizontal sealing mechanism 30. FIG. 15 shows such an example.

In the example shown in FIG. 15, second sealing mechanism 70 includes second horizontal heater bar 71 and second horizontal heater receiving bar 72 which are oppositely disposed with tubular film 1 interposed between them and oppositely moved to press tubular film 1. Second horizontal heater receiving bar 72 is provided with cutting blade 73 capable of back-and-forth motions with respect to second horizontal heater receiving bar 72 for cutting tubular film 1 in the width direction. Cutting blade 73 has an enough length to cut tubular film 1 over the entire width. Second horizontal heater bar 71 has a groove formed therein for receiving cutting blade 73 projecting from second horizontal heater receiving bar 72. The provision of cutting blade 73 for second horizontal sealing mechanism 70 can achieve simultaneous heat sealing and cutting of tubular film 1 with second horizontal sealing mechanism 70 by moving cutting blade 73 forward while second horizontal heater bar 71 and second horizontal heater receiving bar 72 are closed.

(Second Embodiment)

Figure 16:
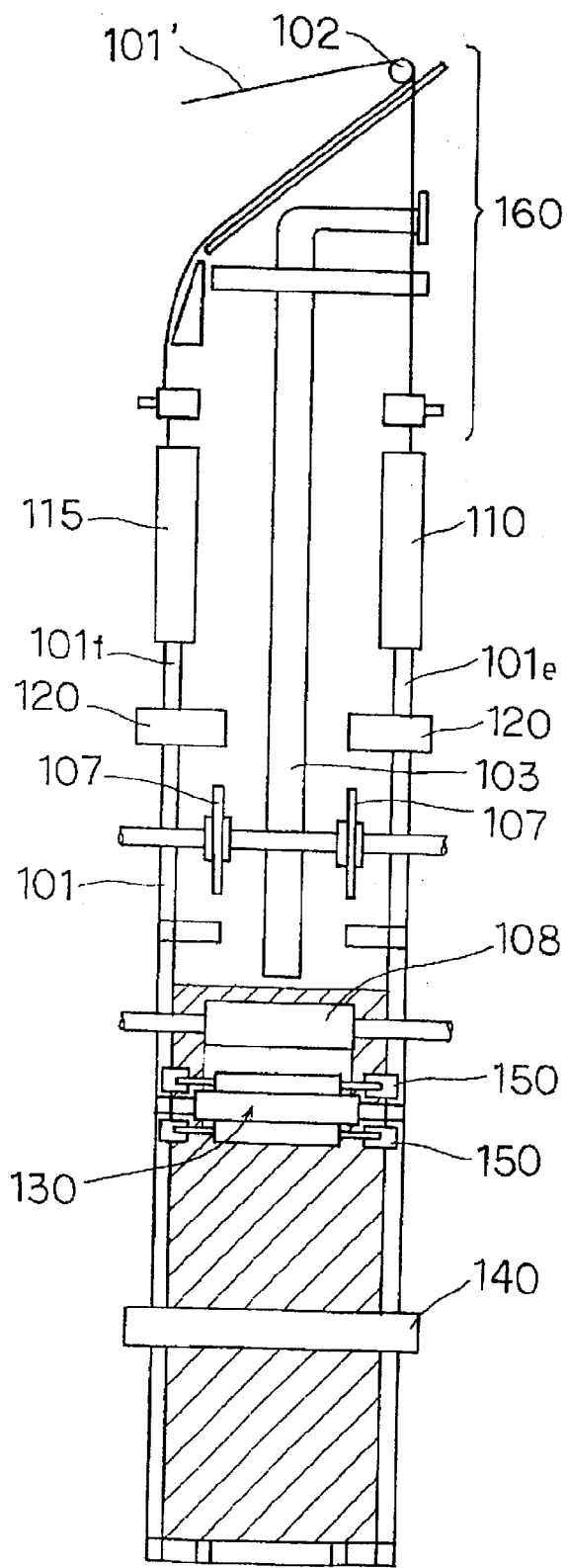
FIG. 16 is a front view showing a vertical type forming, filling and sealing machine according to a second embodiment of the present invention.
Figure 17:
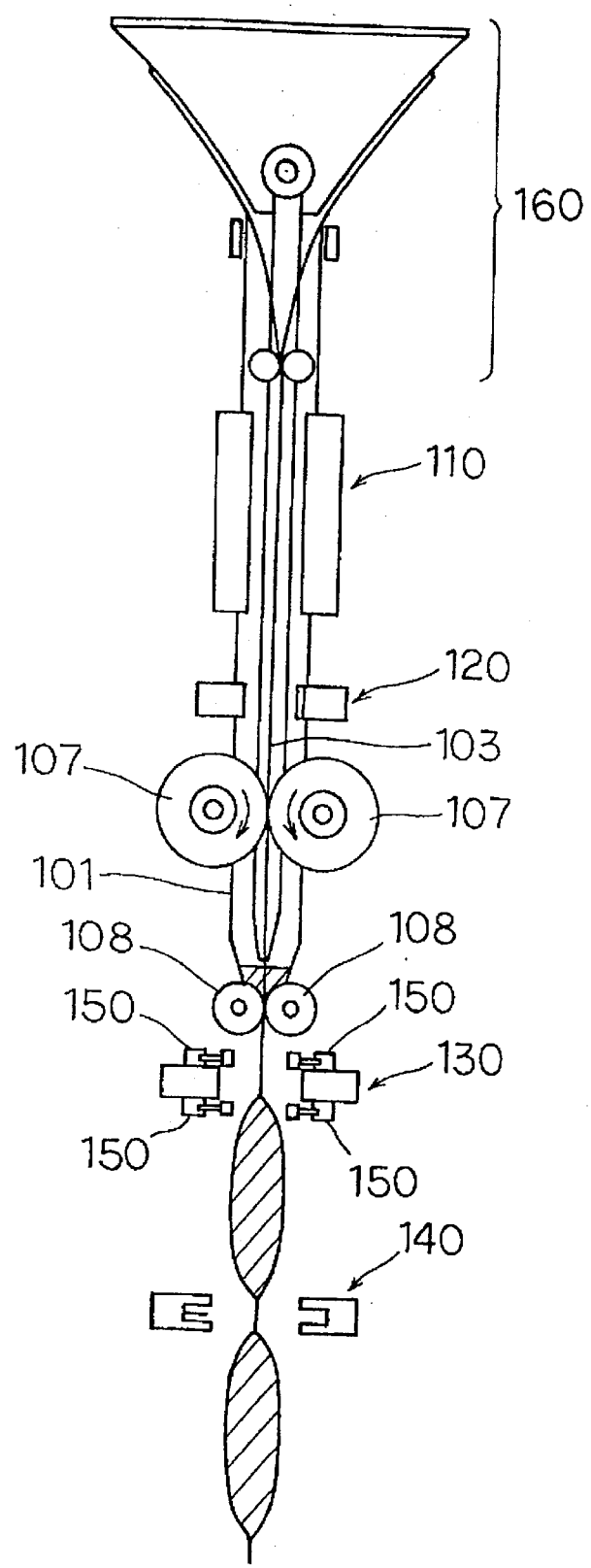
FIG. 17 is a side view of the vertical forming, filling and sealing machine shown in FIG. 16.

FIGS. 16 and 17 are a front view and a side view, respectively, of a vertical type forming, filling and sealing machine according to a second embodiment of the present invention.

The forming, filling and sealing machine of the embodiment manufactures four-side seal type flexible bags by folding long lengths of film 101' in two at the center in its width direction and supplying a filler simultaneously with heat sealing in a predetermined area.

In FIGS. 16 and 17, film folding mechanism 160 is provided in the upper portion of supply nozzle 103 for folding long lengths of film 101' supplied through guide roller 102 from a film supply roller (not shown) in two at the center in its width direction such that both edges thereof substantially match.

Figure 18:
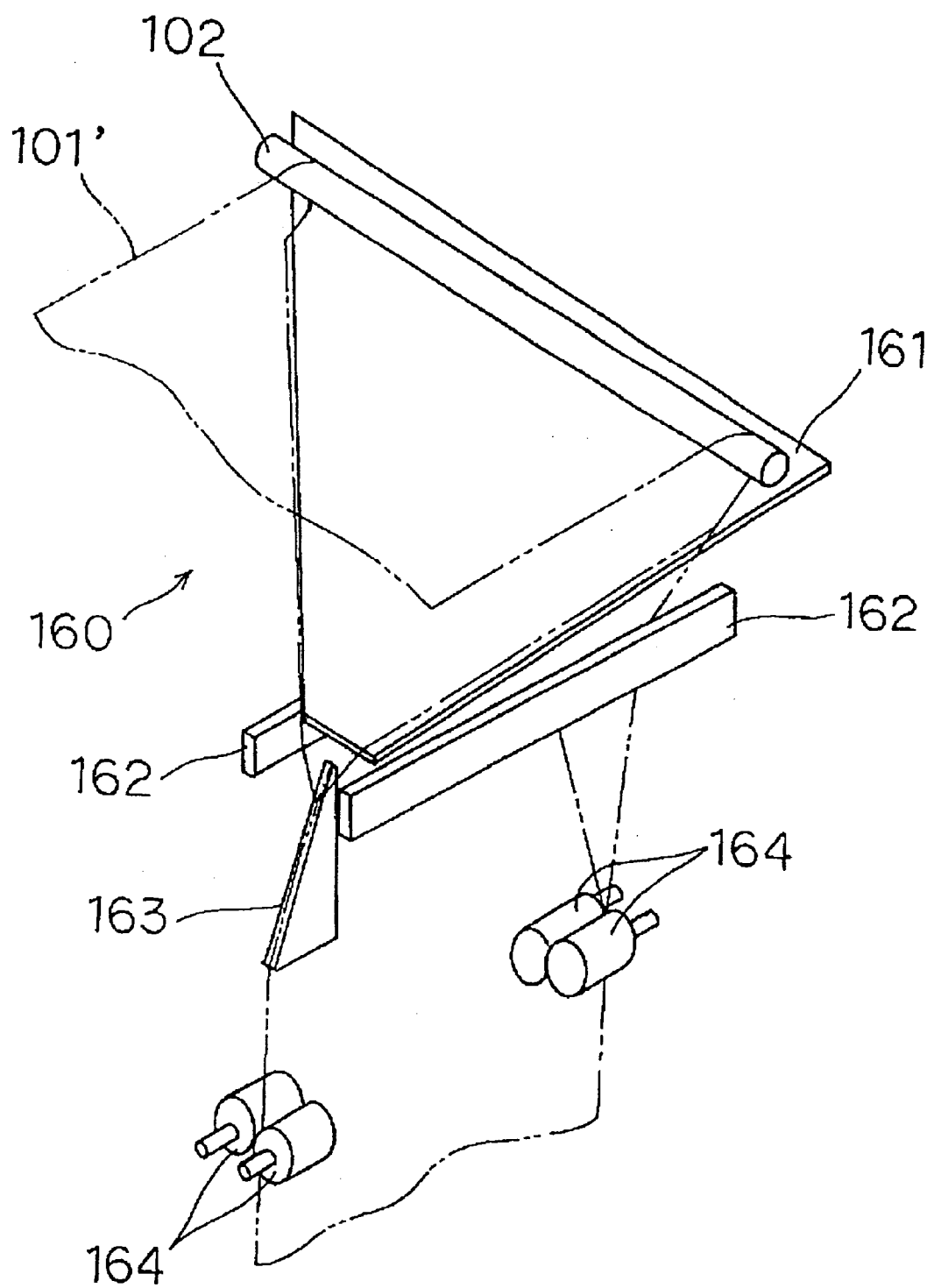
FIG. 18 is a perspective view showing a film folding mechanism shown in FIG. 16.

Film folding mechanism 160 is described in detail with reference to FIG. 18. Film folding mechanism 160 comprises trapezoidal plate 161, two guide arms 162, pushing plate 163, and two pairs of holding rollers 164.

Trapezoidal plate 161 is shaped such that its upper side is longer than its lower side and the width of film 101, and the angles which two oblique sides form with the upper side are equal. Trapezoidal plate 161 is placed below guide rollers 102 obliquely with respect to the vertical direction. Guide arms 162 are disposed below trapezoidal plate 161 in parallel to each other with a spacing between them substantially equal to the length of the lower side of trapezoidal plate 161. Guide arms 162 prevent film 101' from being unfolded at both edges as film 101' is passed on trapezoidal plate 161 and fed downward in close contact with the upper surface of trapezoidal plate 161. Pushing plate 163 is a plate member provided below the lower side of trapezoidal plate 161, and pushes film 101' from the inside at the center in the width direction after it passes trapezoidal plate 161 to form a crease at the center of film 101' in the width direction. Two pairs of holding rollers 164 sandwich the crease and superposed edges of film 101' having the crease, respectively, and guide the feed of film 101' folded in two at the center in the width direction.

Referring again to FIGS. 16 and 17, first vertical sealing mechanism 110 and second vertical sealing mechanism 115 are oppositely placed with supply pipe 103 interposed between them below film folding mechanism 160. First vertical sealing mechanism 110 is placed at the position where the facing edges of film 101' pass, and heat seals the inner surfaces of film 101' along the longitudinal direction at the superposed edges of film 101' to form first vertical seal portion 101e in film 101'. Second vertical sealing mechanism 115 is placed at the position where the crease of film 101' formed by pushing plate 163 passes, and heat seals the inner surfaces of film 101' along the longitudinal direction at the crease of film 101' to form second vertical seal portion 101f in film 101'. Since first vertical sealing mechanism 110 and second vertical sealing mechanism 115 are configured and operated similarly to vertical sealing mechanism 10 shown in FIG. 6, detailed description thereof is omitted.

Film 101' is formed into substantially flat tubular film 101 after it passes film folding mechanism 160 and both edges thereof are heat sealed by first vertical sealing mechanism 110. While the formation of substantially flat tubular film 101 from long lengths of film 101' is similar to the first embodiment, the second embodiment differs from the first embodiment in the position of first vertical seal portion 101e in flattened tubular film 101 corresponding to vertical seal portion 1b (see FIG. 6) in the first embodiment. Specifically, while vertical seal portion 1b is located at the center of flattened tubular film 101 in the width direction in the first embodiment, first vertical seal portion 101e is located at one end of flattened tubular film 101 in the width direction in the second embodiment. Second vertical seal portion 101f is located at the other end of flattened tubular film 101 in the width direction.

Second vertical sealing mechanism 115 is located at the same level as first vertical sealing mechanism 110 in the feed direction of film 101 below film folding mechanism 160 to simultaneously operate first vertical sealing mechanism 110 and second vertical sealing mechanism 115, thereby allowing simultaneous formation of first vertical seal portion 101e and second vertical seal portion 101f.

Two first horizontal sealing mechanisms 120, two feed rollers 107, squeezing rollers 108, second horizontal sealing mechanism 130 provided with wrinkle smoothing mechanisms 150 on the top and bottom, and cutting mechanism 140 are provided below first vertical sealing mechanism 110 and second vertical sealing mechanism 115. Since they are similar to those used in the first embodiment except that they are located in the orientation rotated 90 degrees about the axis of supply nozzle 103 with respect to the layout in the first embodiment, detailed description thereof is omitted. The second embodiment is similar to the first embodiment in that the lower end of supply pipe 103 is located between first horizontal sealing mechanisms 120 and second horizontal sealing mechanism 130.

Figure 19:
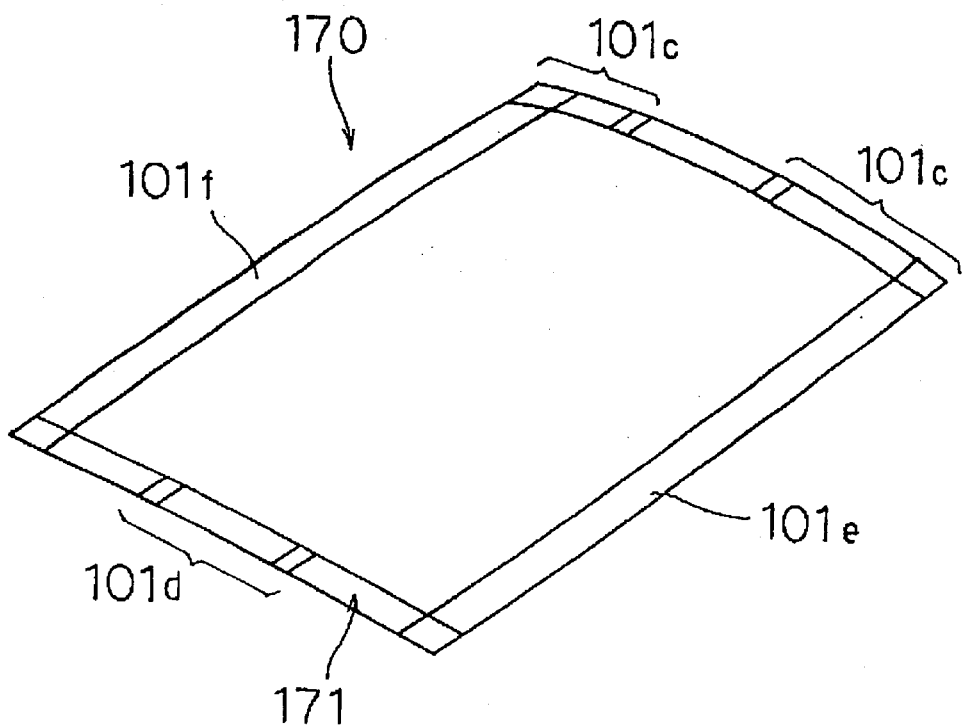
FIG. 19 is a perspective view showing a four-side seal type flexible bag manufactured by the vertical type forming, filling and sealing machine shown in FIG. 16.

The vertical type forming, filling and sealing machine of the second embodiment is operated similarly to the vertical type forming, filling and sealing machine in the first embodiment except the addition of the operation of second vertical sealing mechanism 115. This machine manufactures four-side seal type flexible bag 170 as shown in FIG. 19. Flexible bag 170 includes first and second vertical seal portions 101e, 101f as described above, and horizontal seal portions 171 heat sealed over the entire width of tubular film 101 at both ends of tubular film 101 in the longitudinal direction. Each of horizontal seal portions 171 comprises first horizontal seal portions 101c which are the portions heat sealed by first horizontal sealing mechanisms 120 and second horizontal seal portion 101d which is the portion heat sealed by second horizontal sealing mechanism 130, similarly to the pillow type flexible bag obtained in the first embodiment.

In this manner, first horizontal sealing mechanisms 120 and second horizontal sealing mechanism 130 form horizontal seal portions 171 in two separate steps when four-side seal type flexible bag 170 is manufactured similarly to the first embodiment, thereby obtaining similar effects to those in the first embodiment.

Figure 20:
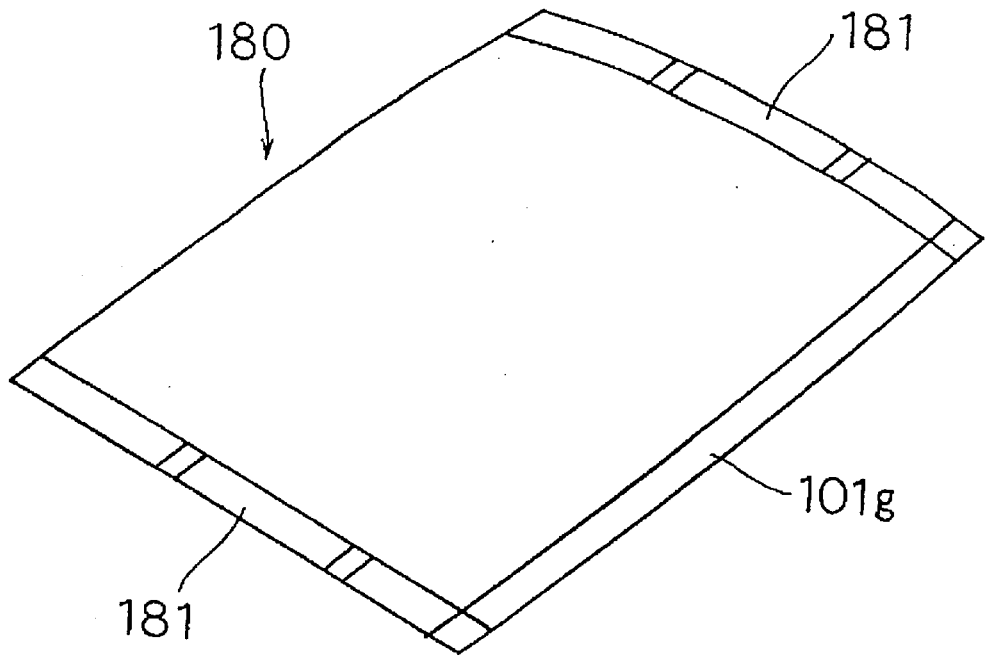
FIG. 20 is a perspective view showing a three-side seal type flexible bag manufactured by the vertical type forming, filling and sealing machine shown in FIG. 16 from which a second vertical sealing mechanism is omitted.

While the embodiment has shown an example where four-side seal type flexible bag 170 is manufactured, three-side seal type flexible bag 180 having vertical seal portion 11g and horizontal seal portions 181 as shown in FIG. 20 can be manufactured by omitting second vertical sealing mechanism 115 not to form second vertical seal portion 101f.

The second embodiment permits various modifications similarly to the first embodiment, such as provision of shutters (not shown) instead of squeezing rollers 108 depending on types of fillers, an increase in the number of supply nozzles 103, addition of a cutting mechanism for tubular film 101 to second horizontal sealing mechanism 130, or reversal of the layout of first horizontal sealing mechanism 120 and second horizontal sealing mechanism 130.

(Third Embodiment)

Figure 21:
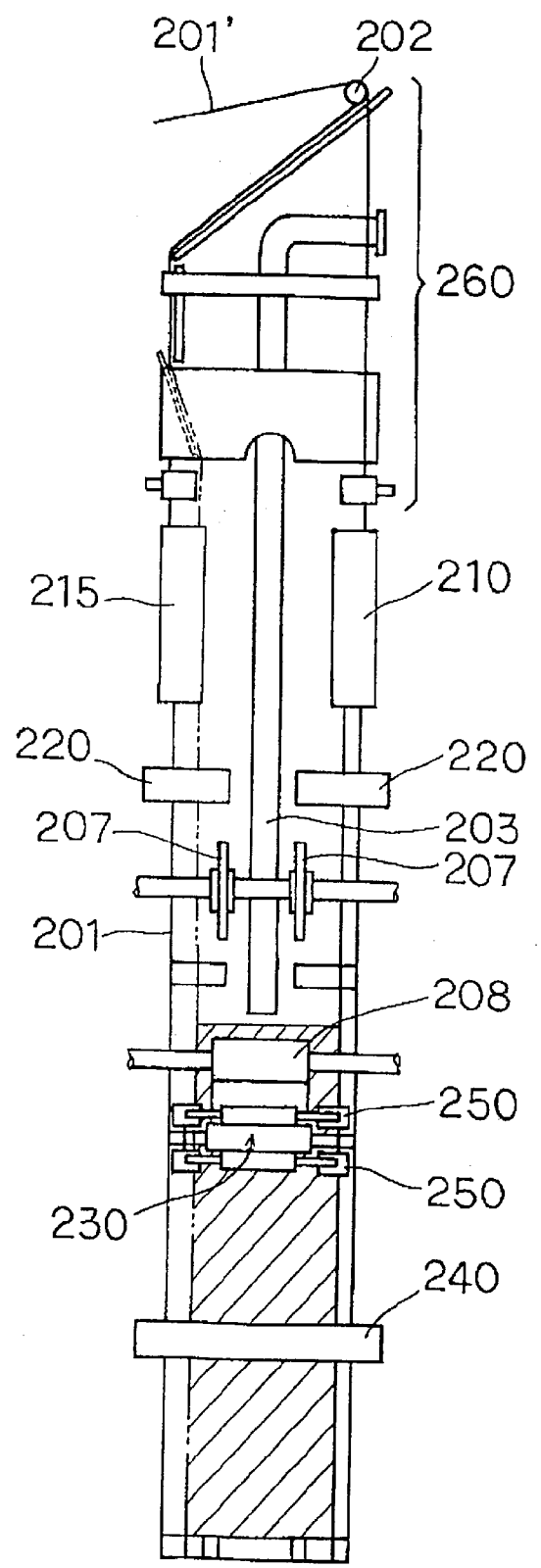
FIG. 21 is a front view showing a vertical type forming, filling and sealing machine according to a third embodiment of the present invention.
Figure 22:
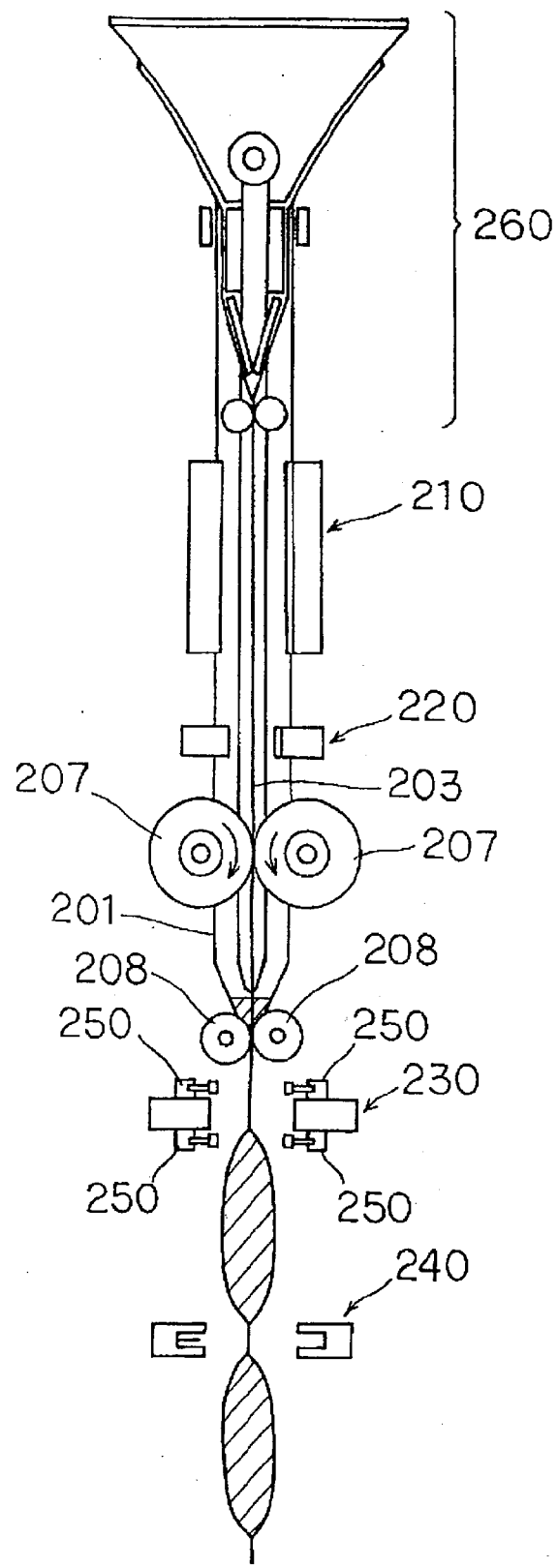
FIG. 22 is a side view of the vertical type forming, filling and sealing machine shown in FIG. 21.

FIGS. 21 and 22 are a front view and a side view of a vertical type forming, filling and sealing machine according to a third embodiment of the present invention.

Figure 26:
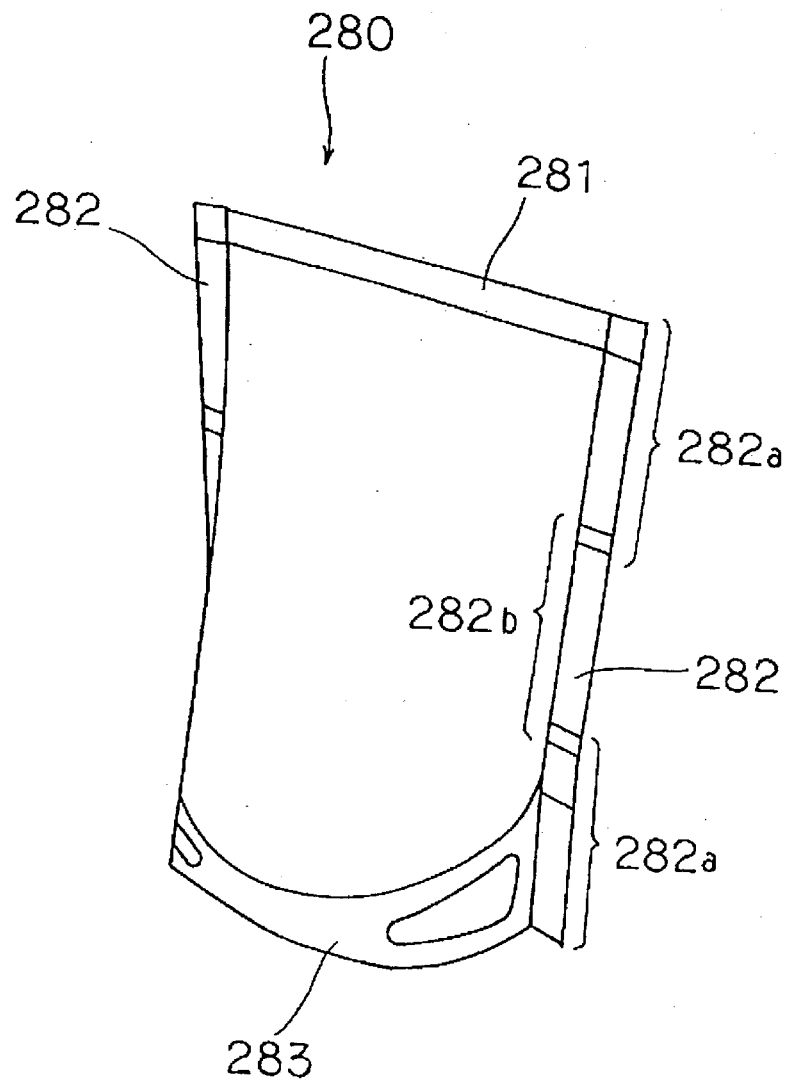
FIG. 26 is a perspective view showing a freestanding bag manufactured by the vertical type forming, filling and sealing machine shown in FIG. 21.

The vertical type forming, filling and sealing machine of the embodiment manufactures freestanding bag 280 having top seal portion 281, side seal portions 281, and bottom seal portion 283 as shown in FIG. 26, and differs from the vertical type forming, filling and sealing machine of the second embodiment shown in FIGS. 16 and 17 in the structures above first horizontal sealing mechanism 220.

In FIGS. 21 and 22, film folding mechanism 260 is provided in the upper portion of supply nozzle 203 for folding long lengths of film 201' supplied through guide roller 202 such that while both edges thereof substantially match, the portion which is to serve as the bottom of freestanding bag 280 is folded inward to obtain a substantially flat shape.

Top sealing mechanism 210 and bottom sealing mechanism 215 are disposed below film folding mechanism 260 for heat sealing the facing inner surfaces of film 201' along the longitudinal direction at both sides in the width direction of film 201' folded in the aforementioned shape by film folding mechanism 260. Top sealing mechanism 210 and bottom sealing mechanism 215 are oppositely disposed with supply pipe 203 interposed between them. Tope sealing mechanism 210 forms top seal portion 281 of freestanding bag 280, while bottom sealing mechanism 215 forms bottom seal portion 283 of freestanding bag 280. Film 201' is formed into substantially flat tubular film 201 with its portion folded inward, as later described, after it passes film folding mechanism 260 and both edges thereof are heat sealed by top sealing mechanism 210.

Two first horizontal sealing mechanisms 220, two sets of feed rollers 207, squeezing rollers 208, second horizontal sealing mechanism 230, and cutting mechanism 240 are provided below top sealing mechanism 210 and bottom sealing mechanism 215. They are similar to those in the second embodiment. Top sealing mechanism 210 corresponds to first vertical sealing mechanism 110 (see FIG. 16) in the second embodiment, and the configuration and operation of top sealing mechanism 210 are similar to those of vertical sealing mechanism 110. Thus, detailed description thereof is omitted in the embodiment, and next, film folding mechanism 260 and bottom sealing mechanism 215 are described in detail.

Figure 23:
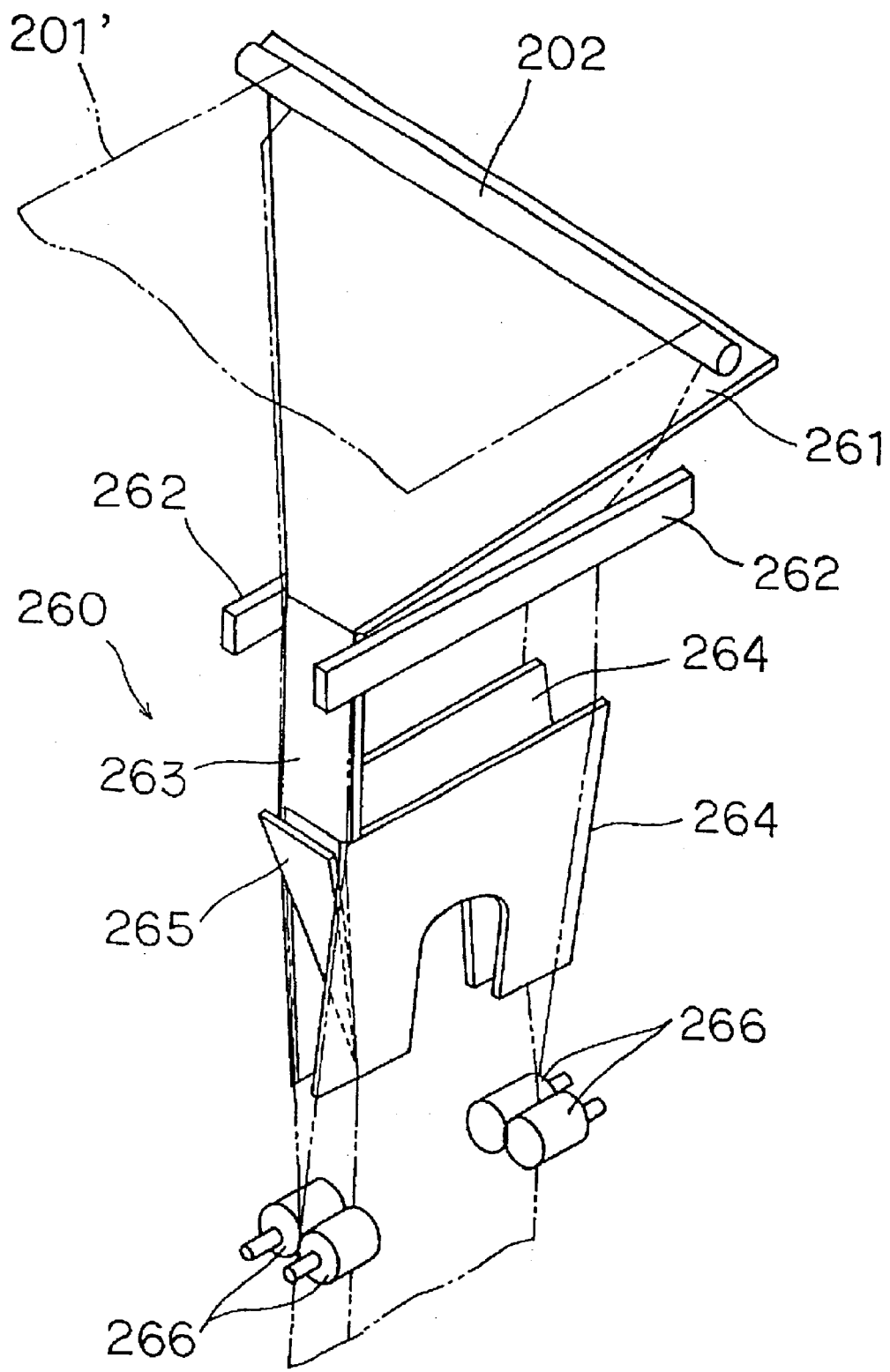
FIG. 23 is a perspective view showing a film folding mechanism shown in FIG. 21.

Description is made for film folding mechanism 260 of the vertical type forming, filling and sealing machine shown in FIG. 21 with reference to FIG. 23.

Film folding mechanism 260 comprises trapezoidal plate 261, two guide arms 262, width defining plate 263, holding plates 264, pushing plate 265, and two pairs of holding rollers 266. Since trapezoidal plate 261, guide arms 262, and holding rollers 266 are similar to those shown in FIG. 18, detailed description thereof is omitted.

Figure 27:
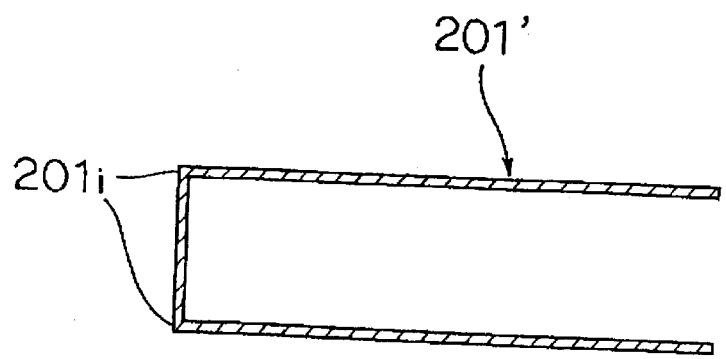
FIG. 27 is a cross section of film after it passes a width defining plate of the film folding mechanism.

Width defining plate 263 is a rectangular plate member placed below the lower side of trapezoidal plate 261, and has a width equal to the lower side of trapezoidal plate 261. After film 201' is passed on trapezoidal plate 261 in close contact with the upper surface of trapezoidal plate 261, two guide arms 262 prevent film 201' from being unfolded at both edges while film 201' is fed downward in close contact with width defining plate 263. In this manner, as shown in FIG. 27, two corners 201i corresponding to both edges of width defining plate 263 are formed in film 201', and the area between corners 201i is to serve as the bottom of freestanding bag 280 (see FIG. 6).

One pushing plate 265 and two holding plates 264 are placed below width defining plate 203 for folding inward the area between corners 201i formed in film 201'. Pushing plate 25 is an inverted triangle member and is placed such that it pushes the area between two corners 201i from the outside associated with the downward movement of film 201'. Holding plates 264 support corners 201i from the inside of film 201' for preventing corners 201i from being pushed in when the area between corners 201i of film 201' is pushed by pushing plate 265.

Figure 28:
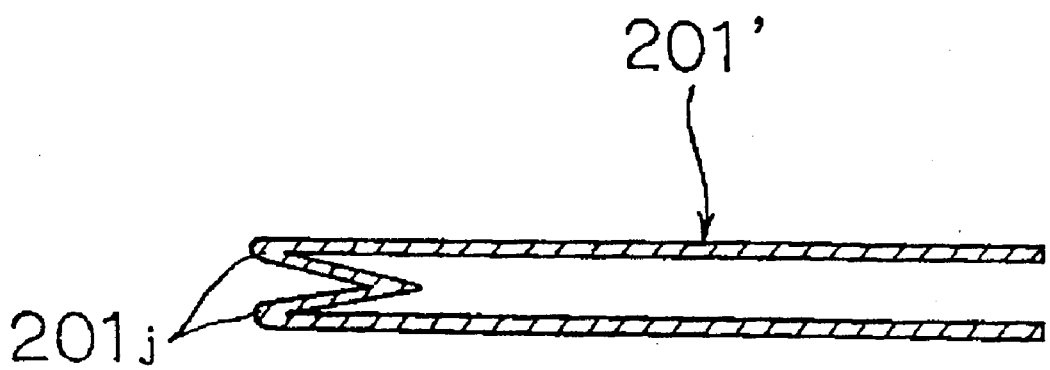
FIG. 28 is a cross section of film after it passes the film folding mechanism.

Holding plates 264 are obliquely disposed such that the interval between them is gradually reduced in accordance with the slope of the oblique sides of pushing plate 265. After film 201' passes the inside of pushing plate 265 and the outside of each of holding plates 264, both sides thereof in the width direction are sandwiched between and guided by holding rollers 266. With this operation, the area between corners 201i of film 201' is folded inward after film 201' passes pushing plate 265 and holding plates 264 to form two projections 201j in film 201' as shown in FIG. 28.

As described above, film 201' passing on the upper surface of trapezoidal plate 261 is folded at the two oblique sides of trapezoidal plate 261 and the lower side between them, and fed downward. At this point, since two oblique sides are at equal angles with respect to the lower side, film 201' is fed with its position self-adjusted such that friction resistances to the oblique sides are equal. AS a result, displacement of film 201' in the width direction associated with the feed thereof, that is, wave of film 201' is prevented. Since the prevention of wave of film 201' in this manner stabilizes the positions of corners 201i in film 201' formed by width defining plate 263 and even the position of projections 201j, heat sealing of the film by sealing mechanisms in subsequent steps can be stably performed without producing displacement.

Next, bottom sealing mechanism 215 is described with reference to FIGS. 24 and 25.

Figure 24:
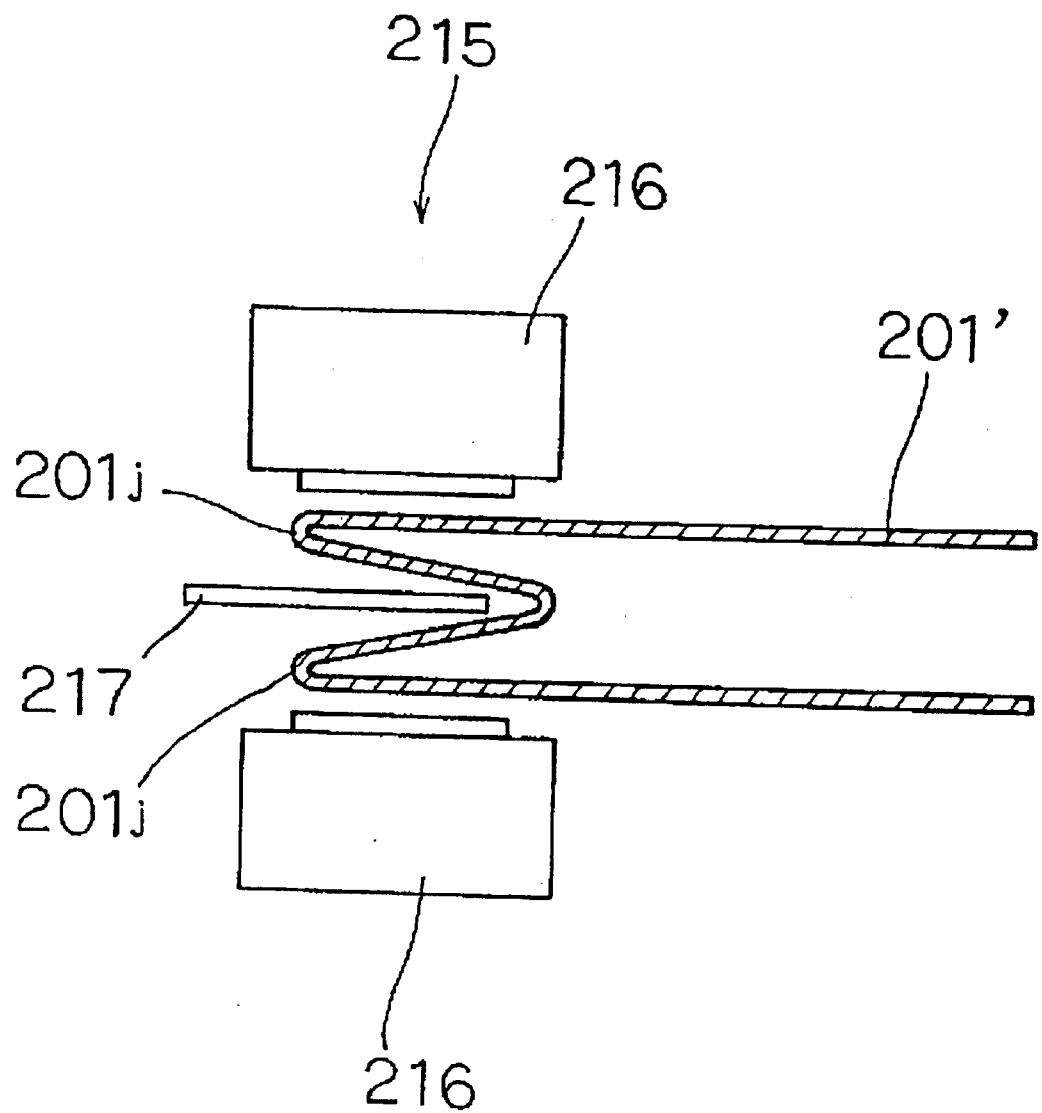
FIG. 24 is a top view showing a bottom sealing mechanism shown in FIG. 21.

As shown in FIG. 24, bottom sealing mechanism 215 comprises a pair of bottom heater bars 216 oppositely disposed and moved by a driving source, not shown, and receiving plate 217 placed between bottom heater bars 216. Film 201' passing film folding mechanism 260 (see FIG. 23) is fed such that receiving plate 217 is located between two projections 291j. The feed of film 201' is stopped, and in this state, bottom heater bars 216 are moved toward each other and press both surfaces of receiving plate 217 to heat seal the portions of film 201' sandwiched between receiving plate 217 and bottom heater bars 216, that is, the opposing inner surfaces of film 201' at two projections 201j. The portion of film 201' heat sealed by bottom sealing mechanism 215 serves as a rib to stably stand a freestanding bag (see FIG. 26).

Figure 25:
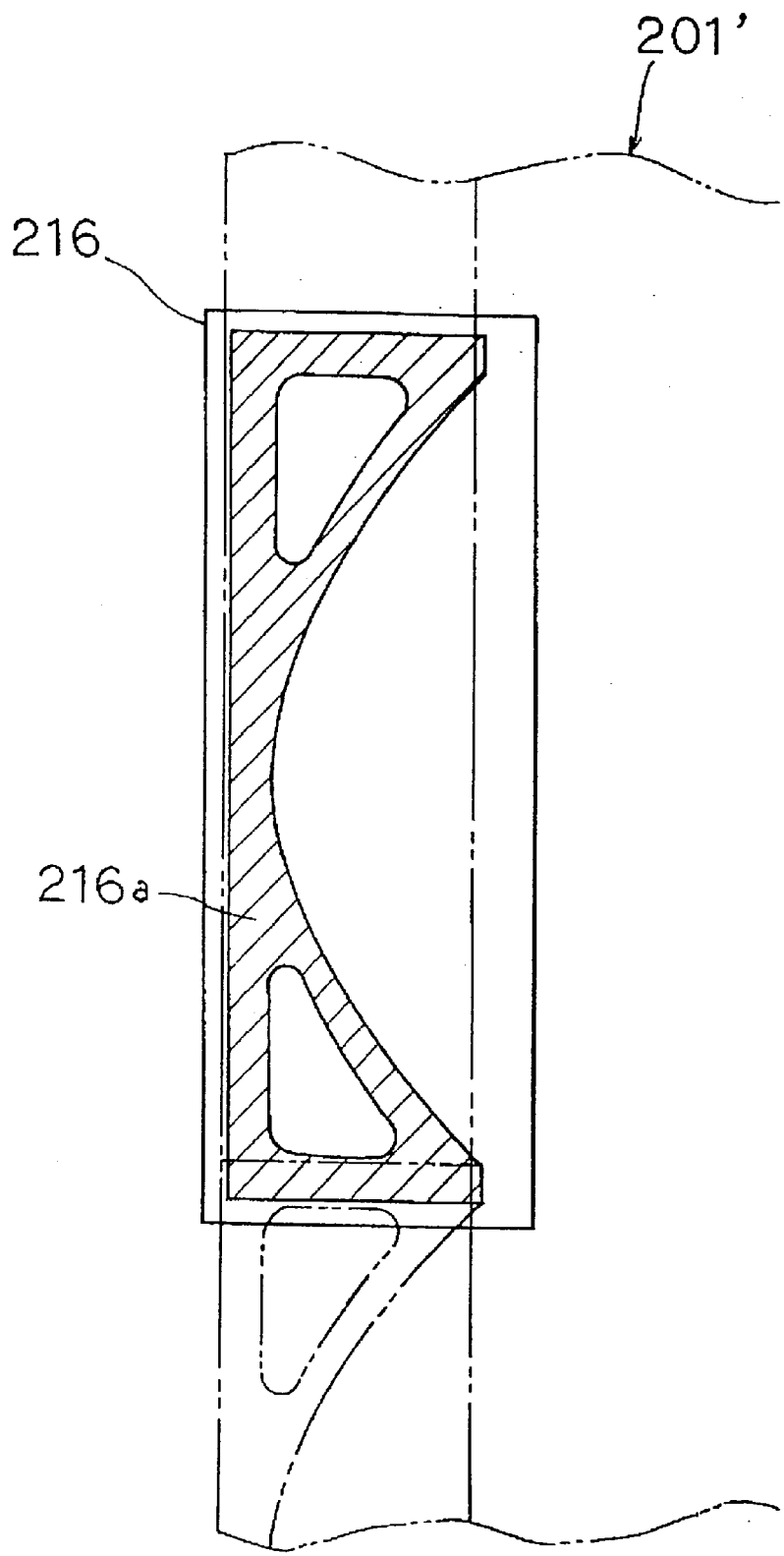
FIG. 25 is a diagram showing a pressing surface of a bottom heater bar shown in FIG. 24.

The pressing surface of each bottom heater bar 216 includes convex portion 216a indicated by hatch lines as shown in FIG. 25. When each bottom heater bar 216 presses projection 201i of film 201', convex portion 216a actually is pressed against film 201'. Thus, the shape of convex portion 216a determines the shape of the aforementioned rib.

The vertical type forming, filling and sealing machine of the third embodiment differs from that of the second embodiment in the configuration of film folding mechanism 260 and bottom sealing mechanism 215 as described above, and the remaining configuration and operation are substantially similar to those of the second embodiment. In this manner, freestanding bag 280 as shown in FIG. 26 is obtained. In the embodiment, freestanding bag 280 is manufactured in a state where top seal portion 281 and bottom seal portion 283 are laid. Thus, in the embodiment, side seal portion 282 corresponds to horizontal seal portion 171 shown in FIG. 19, and comprises first horizontal seal portions 282a heat sealed by first thermal sealing mechanisms 220 and second horizontal seal portion 282b heat sealed by second thermal sealing mechanism 230.

In this manner, first horizontal sealing mechanisms 220 and second horizontal sealing mechanism 230 form side seal portions 282 in two separate steps when freestanding bag 280 is manufactured, thereby obtaining similar effects to those in the first embodiment. Particularly, first horizontal seal portions 282a, formed at two positions on the sides of top seal portion 281 and bottom seal portion 283, includes two thicknesses of the film on the side of top seal portion 281 and four thicknesses of the film on the side of bottom seal portion 283. To achieve more reliable heat sealing of the four thicknesses of the film, it is preferable to apply a higher pressure to the film by first horizontal sealing mechanism 220 to form first horizontal seal portion 282a on the side of bottom seal portion 282 than that on the side of top seal portion 281. The dimensions and positions of the horizontal heater bar and horizontal heater receiving bar of first horizontal sealing mechanism 220 are determined such that first horizontal seal portion 282a on the side of bottom seal portion 282 includes all the four thicknesses of the film.

While the third embodiment of the present invention has been described, the third embodiment permits various modifications similarly to the first embodiment, such as provision of shutters (not shown) instead of squeezing rollers 208 depending on types of fillers, an increase in the number of supply nozzles 203, addition of a cutting mechanism for tubular film 201 to second horizontal sealing mechanism 230, or reversal of the layout of first horizontal sealing mechanism 220 and second horizontal sealing mechanism 230.

While the preferred embodiments of the present invention have been described in detail, various changes and modifications can be made without departing from the spirit or scope of the appended claims.

What is claimed is:

1. A method for manufacturing a flexible bag accommodating contents from long lengths of film while said film is fed downward, said method comprising:

forming a tubular film having a vertical seal portion by heat sealing both edges of said long lengths of film;

heat sealing opposing inner surfaces of said tubular film in its width direction except at least one opening portion for at least one opening;

supplying said contents from said at least one opening into said tubular film;

removing said contents from said at least one opening portion of said tubular film; and heat sealing opposing inner surfaces of said at least one opening portion of said tubular film in its width direction without suctioning the tubular film from an outside of the tubular film after removing said contents from said at least one opening portion.

2. The method for manufacturing a flexible bag according to claim 1, further comprising pulling outward both ends of said tubular film in its width direction at a position corresponding to the position of said at least one opening in a feed direction of said tubular film after the supplying of said contents, wherein said heat sealing of said tubular film in its width direction at said at least one opening is performed after said pulling.

3. The method for manufacturing a flexible bag according to claim 1, wherein said supplying of said contents includes supplying said contents to a position above said at least one opening, and said removing comprises squeezing said tubular film at the position of said at least one opening after supplying said contents.

4. The method for manufacturing a flexible bag according to claim 1, further comprising pressing said tubular film at the lower end of said at least one opening from outside said tubular film to bring inner surfaces of said tubular film into close contact with each other after the supply of said contents, and thereafter said heat sealing of said tubular film in its width direction at said at least one opening is performed.

5. The method for manufacturing a flexible bag according to claim 1, wherein said heat sealing of said tubular film in its width direction includes heat sealing said tubular film such that said vertical seal portion is located at the center of said tubular film in its width direction.

6. The method for manufacturing a flexible bag according to claim 1, further comprising folding said long lengths of film in two at the center in its width direction such that both edges match, wherein said heat sealing of both edges of said long lengths of film is performed after said folding to form said tubular film in flat shape including said vertical seal portion at one end in its width direction.

7. The method for manufacturing a flexible bag according to claim 6, further comprising, after said folding of said long lengths of film in two, heat sealing opposing inner surfaces of said film in its longitudinal direction at a crease formed by folding said film in two, and thereafter said heat sealing of said tubular film in its width direction is performed.

8. The method for manufacturing a flexible bag according to claim 1, further comprising folding said long lengths of film such that its both edges match and folding inward a portion opposite to the matching edges to form two projections, and the heat sealing of opposing inner surfaces of said film in its longitudinal direction at said two projections, wherein said heat sealing of said tubular film in its width direction is performed after said heat sealing of said two projections.

9. The method for manufacturing a flexible bag according to claim 1, further comprising providing a removing device comprising at least one pair of squeezing rollers each having a length substantially equal to the at least one portion of said tubular film in a width length thereof, said pair of rollers being configured to be rotated while nipping said at least one portion of said tubular film therebetween.

10. A vertical type forming, filling and sealing machine for manufacturing a flexible bag accommodating contents from long lengths of film while said film is fed downward, said machine comprising:
a film shaping mechanism configured to superpose both edges of said long lengths of film to oppose the same surface thereof;
a vertical sealing mechanism configured to heat-seal the superposed edges of said film in its longitudinal direction to form tubular film having a vertical seal portion formed by the heat sealing;
a first horizontal sealing mechanism configured to heat-seal opposing inner surfaces of said tubular film in its width direction except at least one portion;
a supply nozzle having a lower end located below said first horizontal sealing mechanism configured to supply said contents from above said tubular film into said tubular film;
a removing device configured to remove said contents from said at least one portion of said tubular film; and
a second horizontal sealing mechanism placed below said removing device and configured to heat-seal without suctioning the tubular film from an outside of the tubular film opposing inner surfaces of said at least one portion of said tubular film in its width direction.

11. The vertical type forming, filling and sealing machine according to claim 10, wherein each of said first horizontal sealing mechanism and said second horizontal sealing mechanism includes a heater bar and a heater receiving bar oppositely placed with said tubular film interposed between them and oppositely moved to press said tubular film.

12. The vertical type forming, filling and sealing machine according to claim 10, further comprising a tension applying mechanism for applying a tension to said tubular film in its width direction prior to the heat sealing by said second horizontal sealing mechanism in the area to be heat sealed by said second horizontal sealing mechanism.

13. The vertical type forming, filling and sealing machine according to claim 10, wherein said removing device comprises at least one pair of squeezing rollers each having a length substantially equal to the at least one portion of said tubular film in a width length thereof, above said second horizontal sealing mechanism, and configured to be rotated with the feed of said tubular film with said at least one portion of said tubular film nipped between them.

14. The vertical type forming, filling and sealing machine according to claim 10, further comprising a shutter, below said second horizontal sealing mechanism, configured to be closed to sandwich said at least one portion of said tubular film at the lower end of the area to be heat sealed by said second horizontal sealing mechanism before the pressing of said tubular film by said second horizontal sealing mechanism.

15. The vertical type forming, filling and sealing machine according to claim 10, wherein said first horizontal sealing mechanism is placed at a position corresponding to the position of heat sealing of both ends of said tubular film in its width direction.

16. The vertical type forming, filling and sealing machine according to claim 10, wherein said first horizontal sealing mechanism is placed at a position corresponding to the position of heat sealing of an area including said vertical seal portion.

17. The vertical type forming, filling and sealing machine according to claim 10, further comprising a film folding mechanism above said vertical sealing mechanism for folding said long lengths of film in two at the center in its width direction such that both edges match.

18. The vertical type forming, filling and sealing machine according to claim 17, further comprising a second vertical sealing mechanism at a position opposite to said vertical sealing mechanism with said film interposed between them for heat sealing opposing inner surfaces of said film in its longitudinal direction at a crease formed in said film by said film folding mechanism.

19. The vertical type forming, filling and sealing machine according to claim 10, further comprising a film folding mechanism above said vertical sealing mechanism for folding said long lengths of film such that its both edges match and folding inward a portion opposite to the matching edges to form two projections.

20. The vertical type forming, filling and sealing machine according to claim 19, further comprising a second vertical sealing mechanism at a position opposite to said vertical sealing mechanism with said film interposed between them for heat sealing opposing inner surfaces of said film in its longitudinal direction at said two projections.

21. A method for manufacturing a flexible bag accommodating contents, said method comprising:
heat sealing opposing inner surfaces of a tubular film in its width direction except at least one opening portion for at least one opening;
supplying said contents from said at least one opening into said tubular film;
removing said contents from said at least one opening portion of said tubular film; and
heat sealing opposing inner surfaces of said tubular film in its width direction at said at least one opening without suctioning the tubular film from an outside of the tubular film after supplying said contents,
wherein said supplying includes supplying said contents to a position above said at least one opening, and said removing comprises squeezing said tubular film at the position of said at least one opening after supplying said contents.

22. A method for manufacturing a flexible bag accommodating contents from long lengths of film while said film is fed downward, said method comprising:
forming a tubular film having a vertical seal portion by heat sealing both edges of said long lengths of film;
heat sealing opposing inner surfaces of said tubular film in its width direction except at least one opening portion for at least one opening;
supplying said contents from said at least one opening into said tubular film;
removing said contents from said at least one opening portion of said tubular film; and
heat sealing opposing inner surfaces of said tubular film in its width direction at said at least one opening without suctioning the tubular film from an outside of the tubular film after supplying said contents,
wherein said supplying includes supplying said contents to a position above said at least one opening, and after the supply of said contents, said heat sealing of said tubular film in its width direction at said at least one opening is performed after removing said contents from said at least one opening is conducted by pressing said tubular film at the position of said at least one opening.

23. The method for manufacturing a flexible bag according to claim 22, further comprising pressing said tubular film at the lower end of said opening from outside said tubular film to bring inner surfaces of said tubular film into close contact with each other after the supply of said contents, and thereafter said heat sealing of said tubular film in its width direction at said at least one opening is performed.

24. A vertical forming, filling and sealing machine for manufacturing a flexible bag accommodating contents from long lengths of film while said film is fed downward, said machine comprising:
a film shaping mechanism configured to superpose both edges of said long lengths of film to oppose the same surface thereof;
a vertical sealing mechanism configured to heat-seal the superposed edges of said film in its longitudinal direction to form tubular film having a vertical seal portion formed by the heat sealing;
a first horizontal sealing mechanism configured to heat-seal opposing inner surfaces of said tubular film in its width direction except at least one portion;
a supply nozzle having a lower end located below said first horizontal sealing mechanism configured to supply said contents from above said tubular film into said tubular film;
a removing device configured to remove said contents from said at least one portion of said tubular film; and
a second horizontal sealing mechanism placed below said lower end of said supply nozzle configured to heat-seal without suctioning the tubular film from an outside of the tubular film opposing inner surfaces of said at least one portion in its width direction,
wherein said first horizontal sealing mechanism is placed at a position corresponding to the position of heat sealing of an area including said vertical seal portion.

* * * * *